US011468151B2

(12) United States Patent
Beckett, Jr.

(10) Patent No.: US 11,468,151 B2
(45) Date of Patent: Oct. 11, 2022

(54) SYSTEM AND METHOD FOR MEMETIC AUTHENTICATION AND IDENTIFICATION

(71) Applicant: Ideola, Inc., Woodstock, IL (US)

(72) Inventor: Daniel G. Beckett, Jr., Woodstock, IL (US)

(73) Assignee: Ideola, Inc., Woodstock, IL (US)

( * ) Notice: Subject to any disclaimer, the term of this patent is extended or adjusted under 35 U.S.C. 154(b) by 337 days.

(21) Appl. No.: 16/555,645

(22) Filed: Aug. 29, 2019

(65) Prior Publication Data

US 2020/0074059 A1 Mar. 5, 2020

Related U.S. Application Data

(60) Provisional application No. 62/724,749, filed on Aug. 30, 2018.

(51) Int. Cl.
*G06F 21/32* (2013.01)
*G06F 16/953* (2019.01)
(Continued)

(52) U.S. Cl.
CPC ............ *G06F 21/32* (2013.01); *G06F 16/953* (2019.01); *G06F 16/955* (2019.01); *H04L 9/3218* (2013.01)

(58) Field of Classification Search
CPC ...... G06F 21/32; G06F 16/955; G06F 16/953; H04L 9/3218
(Continued)

(56) References Cited

U.S. PATENT DOCUMENTS 8,813,219 B2 8/2014 Natividad
9,419,966 B2 8/2016 Natividad
(Continued)

FOREIGN PATENT DOCUMENTS

AU 2018200611 A1 2/2018

OTHER PUBLICATIONS

Maheshwari, "Optimization of Features Selection in Face Recognition System Using Differential Evolution and Genetic Algorithm", Apr. 21, 2016, AISC, vol. 437, pp. 363-374 (Year: 2016).*
(Continued)

*Primary Examiner* — David J Pearson
*Assistant Examiner* — Gregory A Lane
(74) *Attorney, Agent, or Firm* — Leydig, Voit & Mayer, Ltd.

(57) ABSTRACT

A method and system are described for controlling access to online applications using memetic authenticators that are de-identified and passwordless. The method includes curating, issuing ownership, and registering memetic authenticators. The method involves assembling an authenticator package including a fingerprint hash value, matched pairs of user-selected memetic authenticator records, a timer, and encrypting the package using a cipher issued and uniquely-assigned by a service provider. Ciphers may be regenerated on each authentication event providing for episodic re-verification. Fingerprints assign ownership for memetic authenticators, with such associations stored on networked nodes of a distributed database. On authenticating, the client-supplied authenticator package is decrypted and compared to ownership records on an identity network for verification and granting or denying access. The method provides for multilateral verification by retrieving ownership claims from multiple nodes during authentication events. At no time does any party to the system possess everything required to authenticate.

13 Claims, 19 Drawing Sheets

(51) Int. Cl.
*G06F 16/955* (2019.01)
*H04L 9/32* (2006.01)

(58) Field of Classification Search
USPC .......................................................... 713/186
See application file for complete search history.

(56) References Cited

U.S. PATENT DOCUMENTS

| | | | |
|---|---|---|---|
| 9,635,011 B1 | 4/2017 | Wu et al. | |
| 9,785,369 B1 | 10/2017 | Ateniese et al. | |
| 9,807,106 B2 | 10/2017 | Daniel et al. | |
| 9,858,781 B1 | 1/2018 | Campero et al. | |
| 10,166,633 B2 | 1/2019 | Wolf et al. | |
| 10,171,454 B2 | 1/2019 | Natividad | |
| 2003/0225701 A1* | 12/2003 | Lee | G06F 21/10 705/57 |
| 2006/0056621 A1* | 3/2006 | Ramzan | H04L 9/3257 380/28 |
| 2011/0055585 A1* | 3/2011 | Lee | H04L 9/3218 713/183 |
| 2011/0246434 A1* | 10/2011 | Cheenath | G06F 16/955 707/703 |
| 2012/0054251 A1* | 3/2012 | Matsubara | G06F 16/2282 707/812 |
| 2014/0068462 A1 | 3/2014 | Change et al. | |
| 2017/0221253 A1 | 8/2017 | Banerjee et al. | |

OTHER PUBLICATIONS

United States Patent Office, International Search Report in International Patent Application No. PCT/US19/48852; dated Jan. 6, 2020.
United States Patent Office, International Written Opinion in International Patent Application No. PCT/US19/48852; dated Jan. 6, 2020.
Brikman, "Bitcoin by analogy," at webpage downloaded from the Internet at https://www.ybrikman.com/writing/2014/04/24/bitcoin-by-analogy/ on Nov. 13, 2019, 21 pp. (Apr. 24, 2014).
Buterin, "The Meaning of Decentralization," *Medium*, webpage downloaded from the Internet at https://medium.com/@VitalikButerin/the-meaning-of-decentralization-a0c92b76a274 on Nov. 13, 2019, 15 pp. (Feb. 6, 2017).
Custodio, "Smart Contracts for Dummies," webpage downloaded from the Internet at https://medium.freecodecamp.org/smart-contracts-for-dummies-a1ba1e0b9575 on Nov. 13, 2019, 8 pp. (May 26, 2017).
Farahmand, "Blockchain: Evolving Decentralized Identity Design," 43 pp. (Dec. 1, 2017).
Kokumai, "Outline of Mnemonic Guard," blog post downloaded from the Internet at https://expandedpassword.blogspot.com/2017/12/outline-of-mnemonic-guard.html on Nov. 13, 2019, 9 pp. (Dec. 13, 2017).
Nimbusid, "AIRnID © SAML Integration Overview," product brochure, 3 pp. (Jan. 18, 2017).
Pettey, "The Beginner's Guide to Decentralized Identity," webpage downloaded from the Internet at https://www.gartner.com/smarterwithgartner/the-beginners-guide-to-decentralized-identity/ on Nov. 13, 2019, 43 pp. (Jun. 28, 2018).
RSA Security LLC, "User Authentication Trends: Blurred Boundaries and New Methods," RSA ebook, 16 pp. (2017).
Sovrin Foundation, "Sovrin™: A Protocol and Token for Self-Sovereign Identity and Decentralized Trust," white paper, 42 pp. (Jan. 2018).
"Blockchain Demystified," YouTube video (screenshot) downloaded from the Internet at https://www.youtube.com/watch?v=u2t4G9pAb2g on Nov. 13, 2019, 3 pp. (Jun. 20, 2017).

* cited by examiner

SYSTEM AND METHOD FOR MEMETIC AUTHENTICATION AND IDENTIFICATION

CROSS-REFERENCES TO RELATED APPLICATIONS

The present application for patent claims the benefit of U.S. Provisional Patent Application Ser. No. 62/724,749, filed Aug. 30, 2018, the disclosure of which is incorporated herein by reference in its entirety.

BACKGROUND

Field of the Invention

The present disclosure relates in general to systems and methods for identity and access management, and more specifically for controlling access to software applications and data stored on a remote service provider's computer device over a digital data communications network.

Description of the Related Art

Authentication techniques for granting and denying human user access to computer systems, and their resident applications, rely on the user supplying their identification credentials to prove their identity. Authentication between two computer systems, such as found in client-server and services-oriented architectures, may be realized through the exchange of digital certificates managed by a trusted third party, or other shared secrets pre-arranged by administrators during configuration of machine-to-machine communications. In the context of this document, a 'user' may be thought of as a human user or a machine (e.g., computer process) user.

Authentication techniques include something you know (e.g., username/password and PINs), something you have (e.g., digital certificates, hardware tokens, and software tokens), something you are (e.g., biometrics), somewhere you are (e.g., geolocation data combined with Internet Protocol and/or Media Access Control addresses), something you do (e.g., gesture and touch actions), and any combinations thereof (e.g., multi-factor). All of these methods have known weaknesses and have been breached such that bad actors gained unauthorized access, and were able to exploit the accounts associated with the identity (e.g., accessing an online bank account, hijacking a computer process, and the like).

Many authentication methods are characterized by their use of text-based shared secrets, salting of low entropy inputs, bi-lateral verification, and temporal trust. Text-based authenticators are difficult for humans to select, protect, and recall. Shared secrets rarely stay secret forever. In order to ease human recall, text-based authenticators must be relatively short, so they have very low entropy. To avoid collisions and brute force attacks, a cryptographic method called 'salting' must be applied to such low entropy inputs. But the use of salt means that only the credential issuer can know the salt value, otherwise the system is not secure. The requirement for salt constrains all authentication methods to a two-party, or bi-lateral, verification process between the credential issuer (e.g., the 'service provider') and credential holder (e.g., the 'user'). To further ease human recall, many methods allow for long-lived credentials wherein the trustworthiness of the credential (e.g., assurance that the credential has not been compromised) erodes over time.

Multi-factor authentication techniques may become problematic in a networked environment especially where geographically dispersed mobile and Internet-of-Things devices connect with each other and with remotely situated application servers. Whether connected physically (e.g., cable) or over-the-air (e.g., radio) each of these techniques and combinations thereof remain susceptible to theft, hacking, forgery, and like attack and abuse vulnerabilities. Intercepting pass-codes and exploiting account-recovery systems are just two penetration points favored by hackers as attack vectors.

Biometric and behavior-based authentication methods may become problematic due to the fact that the biometric factors consist entirely of personally identifiable information (PII). Worse yet, if such PII is compromised (e.g., the 2015 U.S. Office of Personnel Management security breach wherein the PII and fingerprints of 5.6 million users was stolen), the user has no recourse for 'resetting' their credential. The privacy-invading nature of biometric and behavior-based methods is particularly concerning in light of recent advances in Artificial Intelligence and Machine Learning, wherein these biometric factors can be more easily compromised and spoofed.

Other strong authentication methods involving a cryptographic process, a challenge response protocol, or considering additional contextual information (e.g., geolocation, device ID, and time of day) suffer limitations because they are complicated for users to master and use, leading to poor user adoption rates, and are expensive to deploy due to the high costs associated with technology acquisition, deployment, training, maintenance, and operations.

The rapidly evolving distributed computing era now includes Internet-of-Things devices affecting smart homes (e.g., appliances, cameras, door locks), interconnected cars (e.g., operation and maintenance), industrial internet (e.g., supply chain tracking of goods and automated delivery), and smart cities (e.g., surveillance, energy management, water and environmental monitoring), all configuring an arrangement of sensors relying on Internet connectivity. Distributed computing also includes autonomous application scaling and deployment methods such as Secure Development Operations (SecDevOps) and Continuous Integration/Continuous Delivery (CI/CD) paradigms, wherein computer processes may autonomously instantiate other computer processes, and wherein such processes need to securely connect to each other with minimal human intervention. The rapid deployment and reliance on machine-to-machine interactions introduces new challenges for authentication designs, and has become just as, if not more, significant than human-to-machine authentication.

For these reasons, current authentication methods exhibit less than optimal functionality especially considering that over 1 trillion devices are expected to be inter-connected by 2025.

In light of the above, it would be desirable to have a system and method that improves protecting authentication credentials from external threats including brute-force guessing, key-logging, eavesdropping, shoulder-surfing, screen-scraping, tampering, phishing, stealing, hacking, and spoofing. At the same time, such a system and method should provide credentials that are easy to issue, use, recall, and manage, while providing effective protections for maintaining privacy and confidentiality.

It would therefore be beneficial to provide an authentication mechanism for use in human-to-machine and machine-to-machine configurations that overcome the foregoing security, use, and cost drawbacks present in previously known identity and access management systems. Further, it would be beneficial to provide an identity verification processing system design having improved functionality, including protecting user privacy, anonymity, and confidentiality over current systems and methods exhibiting the negative aspects described herein.

Based on the foregoing, it would be advantageous to provide an easy-to-use authentication scheme for use in securing access control to remote service provider system assets that overcome the foregoing drawbacks present in previously known methods used in the design of identity and access management systems.

SUMMARY

This abridged summary presents some of the basic concepts for select aspects of the disclosure and is intended as an introduction preceding the more detailed description for the present disclosure that is contained herein.

According to one aspect of the present design, there is provided a method for generating memetic authenticators and assigning ownership. The method comprises generating visual memetic authenticators, such as avatars and totems each comprising a sequence of discrete raw image frames, originating from unique digital video content. Alternatively, the method comprises generating non-visual authenticators, such as a first named set and second named set each comprising a sequence of discrete records, originating from unique computer process behavior generated at the time of instantiation of the computer process. Visual authenticators are directed for use in human-to-machine authentication scenarios where non-visual authenticators are directed for use in machine-to-machine authentication scenarios, such as found in the Internet-of-Things, SecDevOps, and CI/CD paradigms. For human-to-machine authentication scenarios, the human-readable visual authenticators may be published on a public website, such as the Apple Store or the Google Play store, for acquisition by end users. For machine-to-machine authentication scenarios, non-visual authenticators may be recorded to a localized or centralized credential vault for automated retrieval, challenge-and-response, and verification between computer processes. In either the visual or non-visual scenario the underlying design, facilities, features, and functionalities are identical.

The method comprises associating a unique key, or fingerprint, with each set of authenticator discrete image frames or discrete named-set records (hereafter, 'discrete records'), for assigning and asserting ownership. The method comprises combining unique device characteristics such as hardware signature, software signature, and serial identifier (e.g., cryptographic pseudorandom string) to form a unique variable length string fingerprint to be used as input into a fixed length hash value. The method comprises associating a hash value for the fingerprint with a hash value for each authenticator record, and storing the hash value pairs on a distributed database. In this way the fingerprint provides the mechanism for assigning, asserting, verifying, and transferring ownership. Transfers in ownership of authenticators are accomplished by associating a different fingerprint to each authenticator set, and storing updated hash value pairs on the distributed database.

According to a second aspect of the present design, there is provided a method for registering a client device with a service provider's application. On receiving registration information, the method comprises the service provider creating a client profile and storing the registration information locally. The method comprises the service provider generating and associating a unique cipher with the locally stored client profile and issuing the cipher to the client by transferring a copy of the associated cipher to the client. On receiving the cipher, the client device may store a copy locally.

The method comprises assigning a first authenticator (e.g., an avatar or first named set) for use by the client device with the service provider's application. On selecting the first authenticator, the client device assigns the authenticator for use with the service provider's application. The method comprises linking a unique variable length string fingerprint to the assigned first authenticator and sending the hash value for the linked fingerprint to the service provider. Registration or enrollment is complete when the service provider records the association of the received fingerprint hash value with the issued cipher and client profile registration information, where all three are stored locally at the service provider.

According to a third aspect of the present design, there is provided a method for controlling access to a service provider's application using memetic authenticators. To initiate a memetic authentication event, the method comprises sending a hash value of the client device's fingerprint to the service provider. On receiving the fingerprint hash value, the service provider responds by sending an authentication challenge to the client device. The method comprises selecting a pair of acquired authenticators, such as matching an avatar with a totem, or matching a first named set with a second named set, locally stored at the client device, where the selection captures a discrete record for the authenticator pair at the precise moment of selection. The authenticator pairs may be randomly selected or, alternatively, in response to a specified pair requested by the service provider.

The method comprises assembling an authenticator package including the fingerprint linked to authenticator pair, the captured first authenticator discrete record (e.g., the avatar or first named set), the captured second authenticator discrete record (e.g., the totem or second named set), and a timer. The method comprises encrypting the authenticator package contents using the previously issued cipher associated with the registration information, and sending the package to the service provider.

The method comprises the service provider decrypting the authenticator package and verifying the supplied timer falls within a locally established time-to-live (TTL) range of acceptable values. If either the decryption or time validation fails the authentication event fails and access is denied.

The method comprises verifying that the hash value of the supplied authenticator record pair (e.g., avatar and totem for human-to-machine, first named set and second named set for machine-to-machine) matches the ownership record on the distributed database. If either comparison fails access is denied. If both comparisons match access is granted.

According to a fourth aspect of the present design, there is provided a method for accessing an application or a uniform resource locator (URL), comprising: transmitting, by a client device, an access request to a service provider server for the application or the URL; receiving, by the client device, an authentication challenge from the service provider for the access request; in response to receiving the authentication challenge, displaying, by the client device, a graphical user interface (GUI) including a first graphical listing of a plurality of first memetic authenticators and a second graphical listing of a plurality of second memetic authenticators, wherein one of the plurality of first memetic authenticators and one of the plurality of second memetic authenticators correspond to a fingerprint associated with the access request; receiving, by the client device and using the GUI, a memetic authenticator pair including one of the first memetic authenticators and one of the second memetic authenticators; assembling, by the client device, the memetic authenticator pair into a authenticator package; and transmitting, by the client device, the authenticator package to the service provider server for adjudication of the access request.

In human-to-machine scenarios, matching a pair of memetic authenticators, as animated avatars and totems, eliminates the need for memorizing complex text-based strings of alphanumeric characters found in username/password designs. Memetic authenticators also eliminate the need for creating a large number of unique username/password pairs for use in authenticating with each unique application.

In machine-to-machine scenarios, self-generated and curated memetic authenticators eliminate the need for human intervention in the credential issuance process, minimizing the risk of human error, accidental credential exposure, or intentional credential theft. As in human-to-machine scenarios, memetic authenticators eliminate the need for humans to create and manage large numbers of unique credentials for autonomous or human-orchestrated application deployment environments.

Because the memetic authenticators are not text-based and therefore do not need to be short in order for humans to recall and replay them, they may contain orders of magnitude higher entropy, thereby eliminating the need for salting. By eliminating the requirement for salt, memetic authentication enables multilateral authentication, wherein no single party possesses all of the raw material at any point in time that would be required to replay or compromise the credential. In this way, overall security of the system is greatly improved, since an attacker would have to compromise all possible endpoints in a multilateral arrangement (e.g., not just the credential issuer or credential holder as with current bilateral methods). Multilateral verification also enables the concept of scalable assurance, where the service provider may configure a policy to perform credential verification against one or more participating nodes without requiring any changes to the client, the authenticators, or the application.

Storing ownership records across multi-node data storage facilities on a distributed database provides for realizing a legitimate multilateral authentication mechanism that overcomes the inherent weaknesses found in current bi-lateral verification designs.

Regenerating ciphers on each authentication event, and/or aperiodically, provides a mechanism for episodic authentication to re-verify trust on-demand that overcomes the weaknesses found in current single point-in-time designs in which trust is known to decay over time.

These and other advantages of the present disclosure will become apparent to those skilled in the art from the following detailed description of the disclosure and the accompanying drawings.

BRIEF DESCRIPTION OF THE DRAWINGS

For a more complete understanding of the present disclosure, reference is now made to the following figures, wherein like reference numbers refer to similar items throughout the figures.

Figure 1:
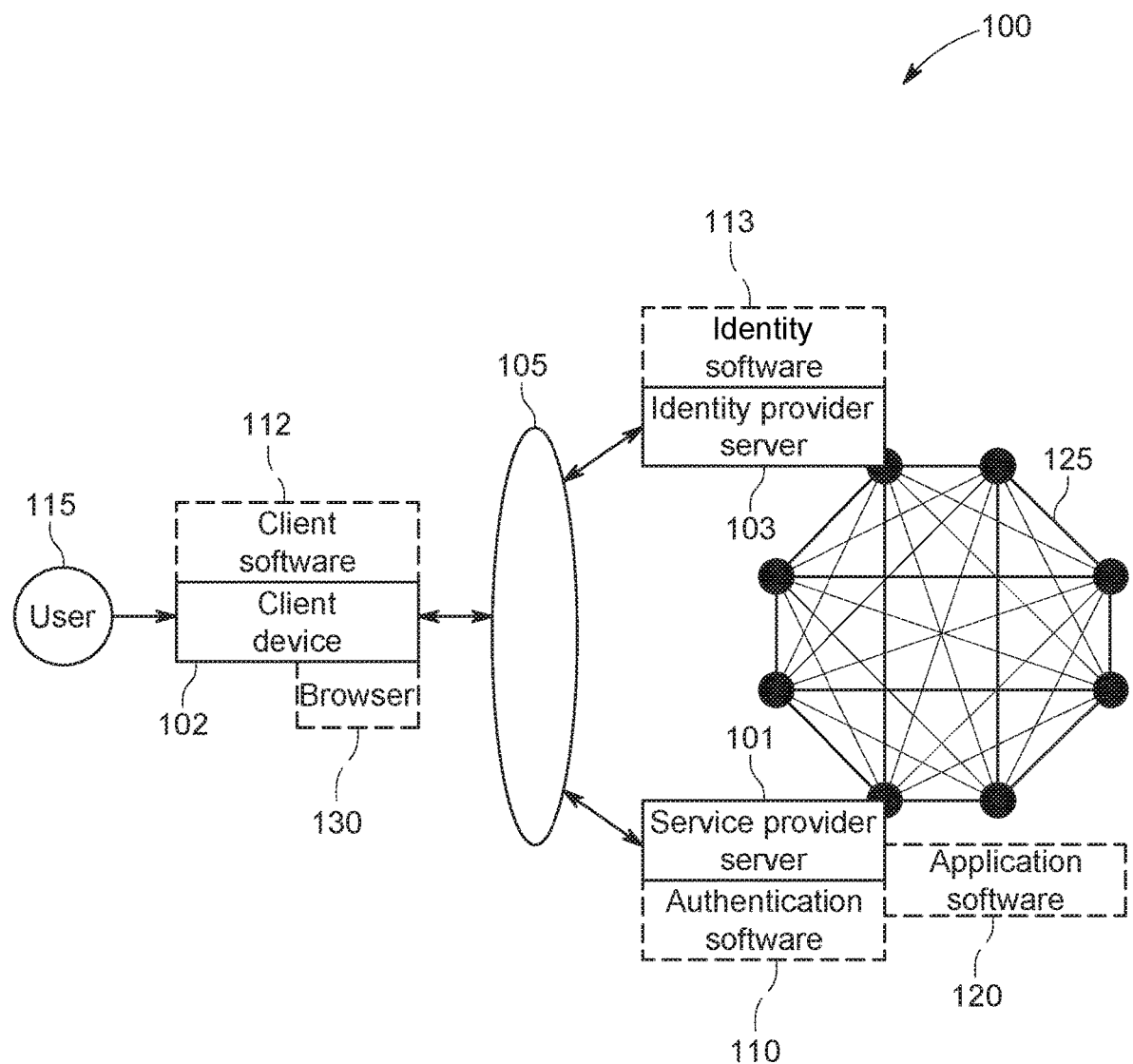
FIG. 1 illustrates a schematic block diagram for an authentication and identification computer system architecture for use in accordance with one embodiment of the present design.

The exemplification set out herein illustrates particular embodiments, and such exemplification is not intended to be construed as limiting in any manner.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present design includes a system and method for memetic authentication and identification. The memetic authentication and identification system and method disclosed herein integrate memetic authenticators with multilateral verification and episodic re-verification techniques.

As used herein, the phrase 'memetic authenticators' is defined as a type of authenticator that is de-identified, passwordless, self-selected, self-customized, and rendered from a variety of digital raw materials wherein raw materials may include but are not limited to any form of digital video, animation, audio, application behavioral signatures, and like media forms.

As used herein, the phrase 'multilateral verification' is defined as involving a plurality of objects during authentication events wherein objects include but are not limited to avatars, totems, fingerprints, timers, and ciphers where no one single participant using the system has access to all the objects at one time, and where at least three participants (e.g., a client, a distributed database node, and a service provider) are required in order to complete an authentication event.

As used herein, the phrase 'episodic re-verification' is defined as requesting re-verification at any time during a user logon session wherein the present design authentication protocol is configured in an arrangement to request the client to return another unique authenticator package.

For purposes of simplifying the disclosure, many examples contained herein illustrate the present design involving memetic authenticators being visual in nature and are described as animated images and discrete image frames suitable for human use scenarios; however, the disclosure herein is not intended to be so limited.

In non-human scenarios involving machine-to-machine interaction, such as found in Internet-of-Things, SecDevOps, and CI/CD paradigms, the memetic authenticators may include any non-visual forms and may take on other abstracted forms of automated computer device behavior captured as digital information, represented in discrete records, such as renderings derived from system or device log entries or other such application behavior signatures. In either scenario the memetic authenticators are realized from imitative digital information passed between multiple endpoints.

In short, visual authenticators, such as avatars and totems, are directed for use in human-to-machine authentication scenarios where non-visual authenticators are directed for use in machine-to-machine authentication scenarios, such as found in Internet-of-Things, SecDevOps, and CI/CD paradigms. In either the visual or non-visual scenario the present disclosure underlying design, facilities, features, and functionalities are identical.

The present design human use scenarios may involve the assembly of 'visual' memetic authenticators from avatars, totems, fingerprints, timers, and ciphers. For purposes of disclosure these terms as used herein are defined.

An 'avatar' is defined as an icon or figure representing a particular user where the present authentication and identification system design is configured to allow the user to create multiple avatars for each desired persona. Each avatar is a self-selected, self-customized memetic authenticator (e.g., animated image) and is de-identified wherein it does not convey any personally identifiable information relating to the user. An avatar may be considered as a conceptual replacement for usernames as used in previous authentication systems.

A 'totem' is defined as an object serving as an emblem or distinctive mark where the present authentication and identification system design is configured to allow the user to associate a totem with each avatar. Each totem is a self-selected, self-customized memetic authenticator (e.g., animated image) and is de-identified wherein it does not convey any personally identifiable information relating to the user. A totem may be considered as a conceptual replacement for passwords as used in previous authentication systems.

A 'fingerprint' is defined as a unique pattern that presents unambiguous evidence where the present authentication and identification system design is configured in an arrangement for providing de-identified user-specific context in the form of a one-way hash value derived from a combination of a serialized identifier associated with a user-selected avatar-totem pair with device-specific context, such as the software signature of the present design client software instance downloaded to the user's device and/or the hardware signature of the user's device.

A 'timer' is defined as a device used for measuring elapsed time wherein the present design the timer represents the user at a given point in time within a specified window of time. In one embodiment the timer is derived from the user's device and the entire system is reconciled to Universal Time Code.

A 'cipher' is defined as a secret method of writing where the present design is configured to invoke an automated mechanism between the client software and the service provider software. The mechanism may initiate a negotiation mechanism between the two entities at the time of user registering with the provider wherein the mechanism may involve an agreed—upon symmetric encryption method and an artificial random or pseudorandom string for use in encrypting the authentication payload during each authentication event. The ciphers may be referred to as 'zero-knowledge ciphers' since the user may not require knowledge of the cipher for the system to function.

The elements that implement the various embodiments of the present system and method are described below, in some cases at an architectural level and in others at a logical level. Many elements may be configured using well known structures. The functionality and processes herein are described in such a manner to enable one of ordinary skill in the art to implement the functionality and processes within the architecture.

The identity provider and service provider processing described below may be performed on independent and separate computational facilities. Each computational facility or separate disperse server environment may be realized by a single platform or by a distributed processing computer platform. In addition, such server processing and functionality can be implemented in the form of special purpose hardware or in the form of software or firmware being run by a general purpose or network processor. Data handled in such processing or created as a result of such processing can be stored in any type of memory as is conventional in the art. By way of example, such data may be stored in a temporary memory, such as in the RAM of a given computer system or subsystem. In addition, or in the alternative, such data may be stored in longer term storage devices, such as magnetic disks, rewritable optical disks, and so on. For purposes of the disclosure herein, a computer-readable media may comprise any form of data storage mechanism, including existing memory technologies as well as hardware or circuit representations of such structures and of such data.

The techniques of the present system and method might be implemented using a variety of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

Further, while primarily described herein with respect to an exemplary system and method for authentication and identification in a client-server online application or service access scenario, the disclosure herein is not intended to be so limited. As noted, the present design may be employed in a variety of scenarios, further including but not limited to any human-to-machine and/or machine-to-machine such as the Internet-of-Things and so forth.

A specific embodiment of the system and method as described below is sometimes referred to as a "Memetic Authentication and Identification System" (MAIS) or as a "MAI system", or even simply as "the system".

The system generally may be implemented using open standards or commercially available development platforms. For example, the system may be implemented with Representational State Transfer (REST) application programming interfaces (APIs) using Microsoft Visual Studio .NET, Microsoft SQL Server (a database), and may be fully XML compliant. The system may run in a secure data center and may be enabled as a web service to provide the technology foundation for identity providers and service providers operating as partners in an enterprise service for authenticating client users.

For purposes of this disclosure the standard Software Development Lifecycle (SDLC) methodology, representing today's current best practices, will be described. Note that while certain examples described below and throughout this document relating to software, applications, modules, algorithms, and programs these examples are meant to be illustrative and not limiting as to the functionality of the present system and method. Other examples and implementations are possible and this document should not be limited by the examples presented.

An exemplary schematic block diagram for an authentication and identification computer system architecture is illustrated in FIG. 1. From FIG. 1, a computer system 100 includes a service provider server 101 used generally for realizing browser accessible web-based applications ("app" for short) such as email, gaming, word processing, photo editing, social media, e-commerce, and the like. Service providers typically rely on an authentication process for controlling access to their sites. Computer system 100 includes an identity provider server 103 used generally for realizing identity management facilities for creating, curating and issuing memetic authenticators. Memetic authenticators are issued from identity provider server 103 to a client device 102 for use during an authentication event. User 115 may submit their memetic authenticator to service provider server 101 in order to gain access to application software 120 in accordance with an aspect of the present disclosure. Service provider server 101 may be in communication over a communication network 105 with a client device 102 such as, for example, a gaming console, personal laptop computer, tablet, or smartphone. In other embodiments, client device 102 may include applications, services, or micro-services in communication with other like applications, services, or micro-services. Identity provider server 103 may be in communication over communication network 105 with client device 102. Communication network 105 may be, for example, the Internet or a local or wide area network realized across a physical cable, wired, or over-the-air, wireless, using radio technologies such as WiFi (e.g., IEEE 802.11x), cellular radio, and satellite transponder. Service provider server 101 may be in communication over an identity network 125 with identity provider server 103.

In an embodiment of the present disclosure identity network 125 is a distributed database that stores an identical copy of the database contents replicated across geographically disperse networked computer nodes. In an exemplary embodiment identity network 125 may involve a blockchain type of distributed ledger database wherein the ledger transactions are stored in blocks that are cryptographically secured. Identity network 125 may configure communication and storage facilities for maintaining the distributed ledger database between the nodes. Although identity network 125 is logically illustrated, in FIG. 1, as a blockchain-enabled networked database, the present disclosure herein is not intended to be so limited. Identity network 125 may be any distributed database where the networking facilities are capable of implementing the communication protocols, computational resources, data replication, and network bandwidth sufficient to support the authentication and identification functionality disclosed herein. Specific implementation details that relate to accessing, transferring, synchronizing, and storing transaction records across the distributed database should be well understood by one skilled in the art.

In accordance with an aspect of the present design user 115 operating client device 102 may logon and access an application software 120 program offered by the service provider. Client device 102 may execute a native software program, for example an Internet browser 130 or other software program, to provide the user interface, for user 115, when accessing and interacting with application software 120. Application software 120 may provide online services and/or web applications including but not limited to ecommerce, gaming, retail sales, social networking, banking, messaging, project tracking, customer relationship management, supply chain management, and so forth. Users of the system may include any person with access to the Internet desiring to register and access a service provider's offering.

In accordance with a further aspect of the present design an identity software 113 program may be used by identity provider service 103 for the creation and issuance of authenticators. In general, human-use directed visual memetic authenticators may involve avatars and totems for submitting by user 115, analogous to previous design involving usernames and passwords, during an authentication event as a credential to claim their identity for verification by service provider server 101 in order to access application software 120. Service provider server 101 may configure authentication software 110 in an arrangement for registering, requesting, receiving and processing the present design avatar-totem pair memetic authentication credentials from a client software 112 program. In one aspect identity provider server 103 may store a copy of all user 115 acquired authenticators on identity network 125. A user may register with service provider server 101 and during registration processing may assign at least one acquired memetic authenticator for use during an authentication event. At the time of authenticating with the service provider user 115 may submit their assigned memetic authenticator via a client software 112 to authentication software 110. Authentication software 110 may validate the authenticator belongs to user 115 by comparing the submitted version with the version stored on identity network 125. If the comparison processing determines that the submitted authenticator matches the stored version authentication software 110 may grant user 115 site access. In the case where the comparison processing determines that the submitted authenticator does not match the version stored on identity network 125 the authentication event fails and authentication software 110 will deny user 115 site access.

In general, the computer system illustrated in FIG. 1 operates to provide for curating, issuing, and registering identity authenticators and for authenticating users to online services or web applications. On assigning an authenticator with an online service provider, user 115 may invoke client software 112 and affect an authentication event with the service provider. For purposes of simplifying the disclosure, the examples contained herein illustrate the present design involving at least one client device, one identity provider server and one service provider server. Simply put, the present design is not so limited and typically will involve a plurality of clients and servers all capable of communicating between and interacting with each other.

Figure 2:
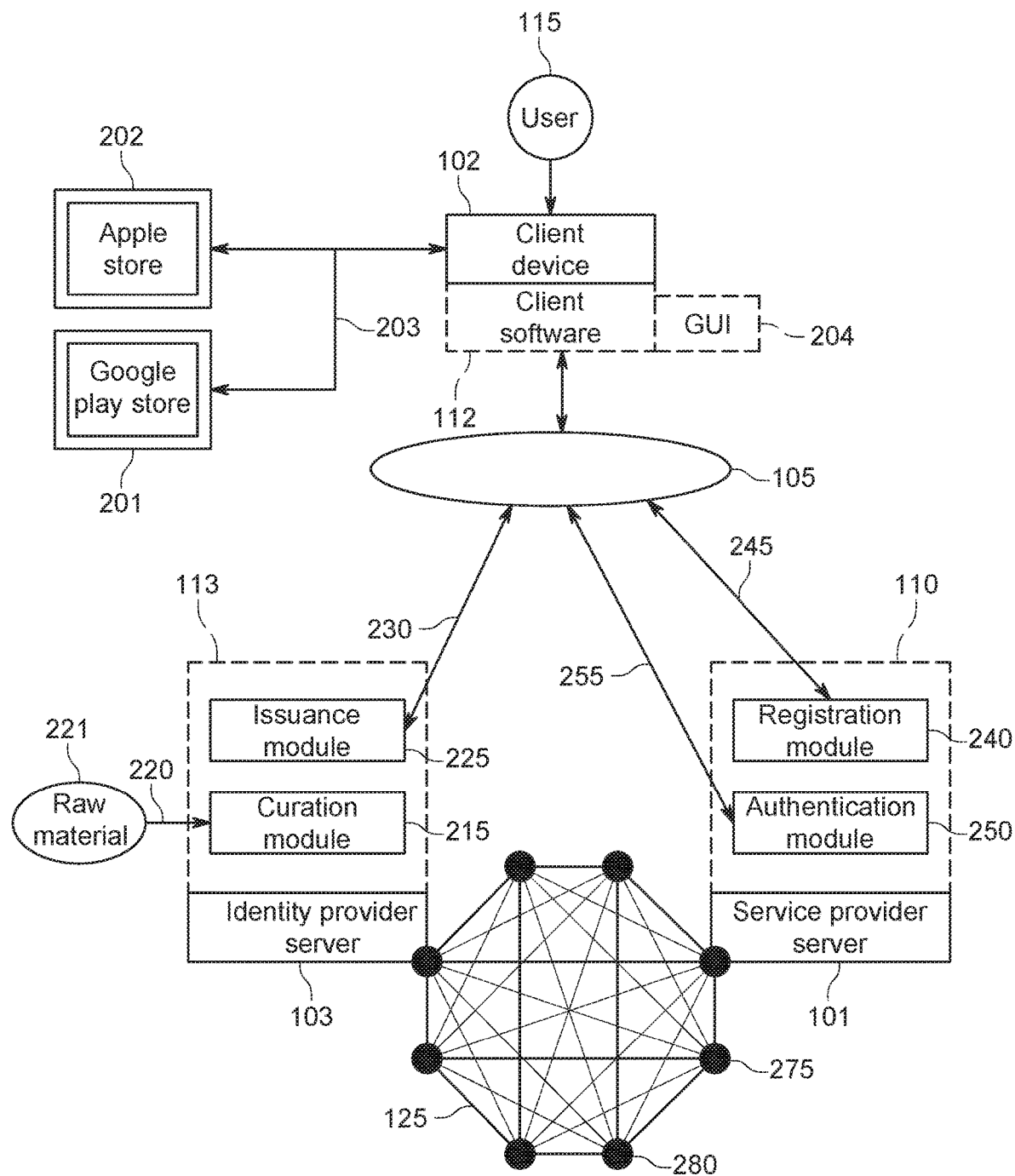
FIG. 2 is an exemplary logical representation of software and modules that may be executed by the system's clients and servers in accordance with an embodiment of the present design.

Referring to FIG. 2, illustrated is an exemplary logical representation of software and modules that may be executed by the client and servers in an embodiment of the present design. Client software 112 may provide a user interface and the necessary software modules for interacting with identity software 113 and authentication software 110. Identity software 113 may provide the necessary software for realizing curation module 215 and issuance module 225 functionalities. Authentication software 110 may provide the necessary software for realizing registration module 240 and authentication module 250 functionalities. Some or all of the logical software applications and/or their underlying modules illustrated for identity provider server 103 and service provider server 101 could, for example, be distributed across multiple servers located throughout identity network 125, for example at point 275 and/or 280. In a further example, the logical software applications and/or their underlying modules illustrated for identity provider server 103 could be co-located with client software 112 in client device 102.

User 115 may download, at 203, a copy of client software 112 developed for installation on their device. For example, owners of Android devices may use the preinstalled native Google Play Store application for accessing the Google Play Store at point 201 and owners of Apple devices may use the preinstalled native Apple Store application for accessing the Apple Store at point 202. In either case, user 115 may use the store's search facility to locate the present design's client application and select install. On completion of the installation processing, user 115 may open and run their copy of client software 112. Executing an instance of client software 112, in local memory on client device 102, may configure the device as an active client node available for creating, consuming and communicating information within the memetic authentication and identification system. Participating as an active node, client device 102 may configure a secure connection for communicating securely, at 230, with identity provider server 103 and with service provider server 101, at 245 and/or 255, over communication network 105. Through the secure connection arrangement client software 112 may communicate and interact with the features and facilities made available from identity software 113 and authentication software 110. Client software 112 may provide a graphical user interface (GUI) 204 for user 115 to interact and operate client software 112 facilities using graphical icons and like visual indicators.

In accordance with an embodiment, to facilitate operation of the system, the raw materials for creating avatars and totems are first curated into useable authenticators and made available for issuing to the various users of the system.

At 220, curation module 215 may receive an upload of raw material 221 in the form of digital content (e.g., digital video, animation, audio, application behavioral signatures, and like media forms) required for generating visual memetic authenticators (e.g., avatars and totems) and non-visual memetic authenticators (e.g., derived from log entries or application behavioral signatures). In short, the present design curation module 215 may configure an upload portal facility in an arrangement for executing the functionality necessary for receiving digital content submissions over the Internet from individual amateurs, third-party professionals, and stock content created from other identity providers.

Curation module 215 may translate the uploaded raw materials to yield a plurality of predefined standardized memetic authenticators. Translation processing may include normalizing the uploaded digital content to a common format (e.g., aspect ratio, or resolution, or duration, or rate, or length, or data elements, or encoding, and/or combinations thereof), deconstruct (e.g., partition) the normalized content into discrete frames or records in a sequence, embed hidden information within the frames (e.g., steganography techniques including a serial number, or watermark, or authenticator provenance, and/or combinations thereof), and reconstruct the sequence of discrete frames, or records, into human-readable animated image files or machine-readable related named-set records. Translating may involve applying a cryptographic hashing function for generating a hash value for each authenticator (e.g., a hash value for each discrete avatar image frame and a hash value for each discrete totem image frame). Curation module 215 may generate a plurality of unique fingerprints (refer to FIG. 3) and may associate a unique fingerprint to at least one avatar image frame (or named-set record) and a unique fingerprint to at least one totem image frame (or named-set record) (refer to FIG. 4). On associating the fingerprint with the authenticator's discrete records, curation module 215 may submit the associated fingerprint-record hash value pairs as transaction records, illustrated in FIG. 4, for verification onto the distributed database such as identity network 125. Associating fingerprints with authenticators in this way assigns the ownership of the authenticators to the identity provider. In short, the present disclosure curation processing creates a transaction record for storage on a database instance, at node 275 and 280, curated into useable authenticators. Curation module 215 may publish the avatar and totem authenticators, in their reconstructed single animation image file format, to public online application stores such Google Play Store 201 and Apple Store 202. On publishing, users of the system may acquire available avatars and totems by downloading the files from the online public application stores.

In general, issuance module 225 may issue curated authenticators based on requests received from users of the present designs authentication and identification system. User 115 may browse and select one or more authenticators, at 230. On selecting, client software 112 may send a unique fingerprint in exchange for each selected authenticator. Issuance module 225 may associate this fingerprint with the selected authenticator and create a new transaction record representing this association. Issuance module 225 may submit the newly created transaction record to the distributed database for verification, recordation, and replication across the distributed database. On recording, the ownership of acquired authenticator is transferred from the identity provider to the user.

Authentication software 110 may provide the necessary software modules for realizing registration module 240 and authentication module 250 functionalities. Before interacting with a service provider, users of the system register with each service provider they desire to access.

During the registration process authentication software 110 may associate a user's assigned memetic authenticator to service provider server 101 for granting access. User 115 may navigate and access the service provider's registration page and enter their name, address, and so forth, and may submit, at 245, their registration information. On submitting, registration module 240 may create a user's registration profile from the supplied enrollment information and store this user profile locally. On creating a user profile, registration module 240 may associate and issue a unique zero-knowledge cipher with user 115 and record the association with their enrollment information and exchange the cipher for a client node fingerprint, at 245. On receiving the cipher, client software 112 may prompt the user, via GUI 204, to select an avatar from the displayed set of all acquired avatars. User 115 may choose and assign their desired avatar for use with the service provider. Client software 112 may associate the appropriate fingerprint, linked to the selected avatar during acquisition, with the cipher received from the service provider. On successful assignment, client software 112 may communicate, at 245, and send the appropriate avatar-linked fingerprint hash value. On receiving the fingerprint hash value, registration module 240 may append the received fingerprint hash value to the previously locally-stored user profile enrollment/registration information and issued cipher.

On successful registration, when user 115 attempts to access a service provider's web site application or service, client software 112 may initiate an authentication event. The authentication event may involve transmitting the hash value for the appropriate avatar-linked fingerprint, based on the assignment made during registration, at 255, to authentication module 250 executing on service provider server 101. Authentication module 250 may send an authentication request (e.g., challenge) to client software 112, at 255. On receiving the request for authentication, client software 112 may prompt user 115 by displaying a list of randomly ordered icons, via GUI 204, representing all of the user's acquired animated avatars alongside a list of randomly ordered icons representing all of the user's acquired animated totems. On prompting, the user may form their authentication response by selecting and matching the appropriate avatar-totem pair via the GUI. Selecting an avatar-totem pair may involve the user selecting the pair by either a swiping motion for connecting the pair or by a two-step tapping gesture, the first tap to choose the avatar and the second tap to choose the totem. On selecting, client software 112 may capture the discrete records displaying at the instance of selection for the animated avatar and the animated totem. On capturing, client software 112 may assemble a memetic authenticator package (e.g., response) wherein the package may include the fingerprint hash value associated with the avatar during acquisition (e.g., issuing ownership), the captured avatar discrete record, the captured totem discrete record, and a timer value. Client application 112 may encrypt the memetic authenticator package using the locally stored cipher previously received from registration module 240 (e.g., associated with avatar-linked fingerprint during registration). On encrypting, client software 112 may send and transmit the memetic authenticator package to authentication module 250, at 255.

On receiving the encrypted authenticator package authentication module 250 processing may decrypt the contents using the locally stored cipher associated with the fingerprint hash value previously recorded during the registration process. On successful decryption authentication module 250 may validate the timer value is within the service provider's expected TTL acceptable range.

In the situation where either the decryption process or timer value validation process fail, the authentication event fails and the service provider denies access to user 115. In the situation where both the decryption processing and timer value validation processing succeed the authentication processing continues to the next step. Authentication module 250 may query the distributed database on identity network 125 to determine if the authenticator package contents match the recorded contents on identity network 125.

In short, the hash value for fingerprint supplied in the authenticator package is paired with the hash value for the first authenticator record; this pair is compared to the ownership record (e.g., fingerprint hash value and record hash value pair) returned from querying identity network 125. Similarly, and in parallel, the hash value for fingerprint supplied in the authenticator package is paired with the hash value for the second authenticator record and is compared to the ownership record (e.g., fingerprint hash value and record hash value pair) returned from querying identity network 125. In the situation where the comparison process determines that either pair does not identically match, the authentication attempt fails and the service provider denies access to user 115. In the situation where the comparison process determines both pairs do identically match the authentication attempt succeeds and the service provider grants access to user 115.

Simply put, authentication module 250 may resolve the authentication attempt and grant access in the situation where the encrypted memetic authenticator package is successfully decrypted with the locally stored cipher, and where the timer value, e.g., timestamp, falls within the pre-established TTL acceptable range, and where the fingerprint-record hash values pairs both match the recorded hash values assigning ownership in the distributed database. Authentication module 250 may resolve the authentication attempt and deny access in the situation where any of the above disclosed conditions are not met.

Note that while certain examples are provided here and throughout this document, these examples are meant to be illustrative and not limiting as to the functionality of the present system and method. Other examples and implementations are possible and this document should not be limited by the examples presented.

It should be noted that while the logical representation presented in FIG. 2 of the software illustrates various blocks, modules, and components, the lines of demarcation between the various components are not hard and fast, and certain functionality may be performed by various components, including single components or combinations of components, and the functionality described herein is not a hard and fast set of requirements. For example, client software 112 may simply curate locally-generated stock digital video content, emulating the functionality found in curation module 215, and may communicate with identity network 125 (not illustrated in FIG. 2) and record ownership on the distributed database using the device's fingerprint, emulating functionality found in issuance module 225. In this arrangement identity provider server 103 is not required for transferring ownership for avatar and totem authenticators to client software 112. In general, the processing remains identical between both arrangements, where certain steps may be eliminated when collocating identity provider server 103 functionality with client software 112 functionality.

As another example, service provider 101 may operate local nodes of a distributed database for authentication scenarios requiring low assurance; or by configuring a service provider-specified policy, may require that verification of authenticators come from one or more non-local nodes on the distributed database, or that each authenticator be verified by N number of nodes on the distributed database. In this way, the service provider may allow for scalable assurance levels in the authentication event without requiring any changes to the authenticators, the identity network, the behavior of the client software, or the service provider's applications.

Figure 3:
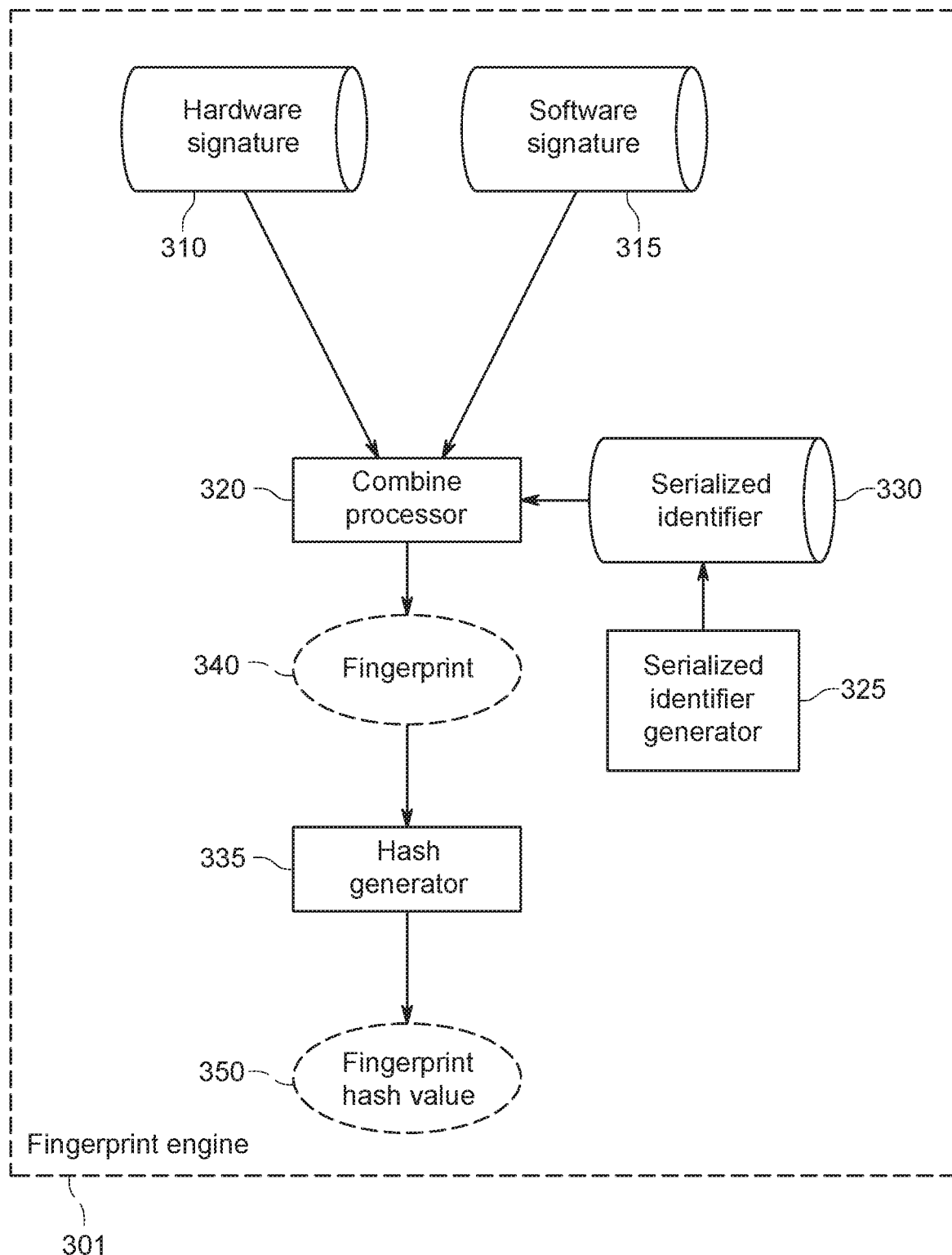
FIG. 3 illustrates an exemplary process flow for generating fingerprints in accordance with an aspect of the present disclosure.

Now referring to FIG. 3, illustrated is an exemplary process flow for generating fingerprints, and hash values thereof, in accordance with an aspect of the present disclosure. In general, the system may involve generating a unique fingerprint pattern purposed for assigning, asserting, verifying, and transferring, ownership of memetic authenticators, and associating to ciphers, for example during registration. The process disclosed herein is suitable for generating fingerprints for use in the system during the curation, issuance, registration and authentication processing. A fingerprint engine 301 may generate a plurality of unique fingerprints and may operate dynamically for generating fingerprints on an as-needed, just-in-time, basis.

A combine processor 305 may configure an algorithm for collecting a hardware signature 310, a software signature 315, and a unique serialized identifier 330, such as a pseudorandom string, from a serialized identifier generator 325 as input. Hardware signature 310 may include any uniquely identifying characteristic specific to the executing environment device hardware. For example, hardware signature 310 may represent a digitally embedded device serial number, a media access control (MAC) address, an international mobile equipment identity (IMEI) number for cellular radio enabled devices, resident operating system and version, an integrated circuit card identifier (ICCID), serial number from a subscriber identity module (SIM) for device designs that support such integrated circuits, and any combinations thereof. Software signature 315 may include any uniquely identifying characteristic specific to the software application executing from the device's memory such as a software instance identifier, software digest/checksum, software digital certificate, and any combinations thereof. For example, software signature 315 may involve using the instance identifier of the identity software 113 (FIG. 1) application executing on identity provider server 103 (FIG. 1), or using the instance identifier for client software 112 (FIG. 1) executing on client device 102 (FIG. 1). Serialized identifier generator 325 may provide for originating a simple sequential number, or a cryptographic pseudorandom string. Combine processor 320 may provide for joining hardware signature 310 with software signature 315 and with serialized identifier 330 into a variable-length string fingerprint 340. Hash generator 335 may receive variable-length string fingerprint 340 from combine processor 320 as input and apply a one-way hashing function, such as MD4, MD5, bcrypt, SHA256, SHA256d, or other well-known hashing algorithms, to convert the received input string into a fixed-length irreversible binary sequence hash value. The resultant fixed-length binary sequence hash value is now available for use by the system as a fingerprint hash value 350. Fingerprint engine 301 may generate a distinct unique fingerprint for each new pseudorandom string originating from serialized identifier generator 325, or by incrementing the sequence number, as the next value for serialized identifier 330 and repeating the above disclosed fingerprint engine 301 processing employing the new number in generating a plurality of fingerprints.

In another embodiment fingerprint engine 301 may configure combine processor 305 in an arrangement for only collecting one signature, either hardware signature 310 or software signature 315. In this arrangement combine processor 320 may provide for assembling either hardware signature 310 or software signature 315 with serialized identifier 330 into variable-length string fingerprint 340. Fingerprint engine 301 processing continues as previously disclosed above.

Figure 4:
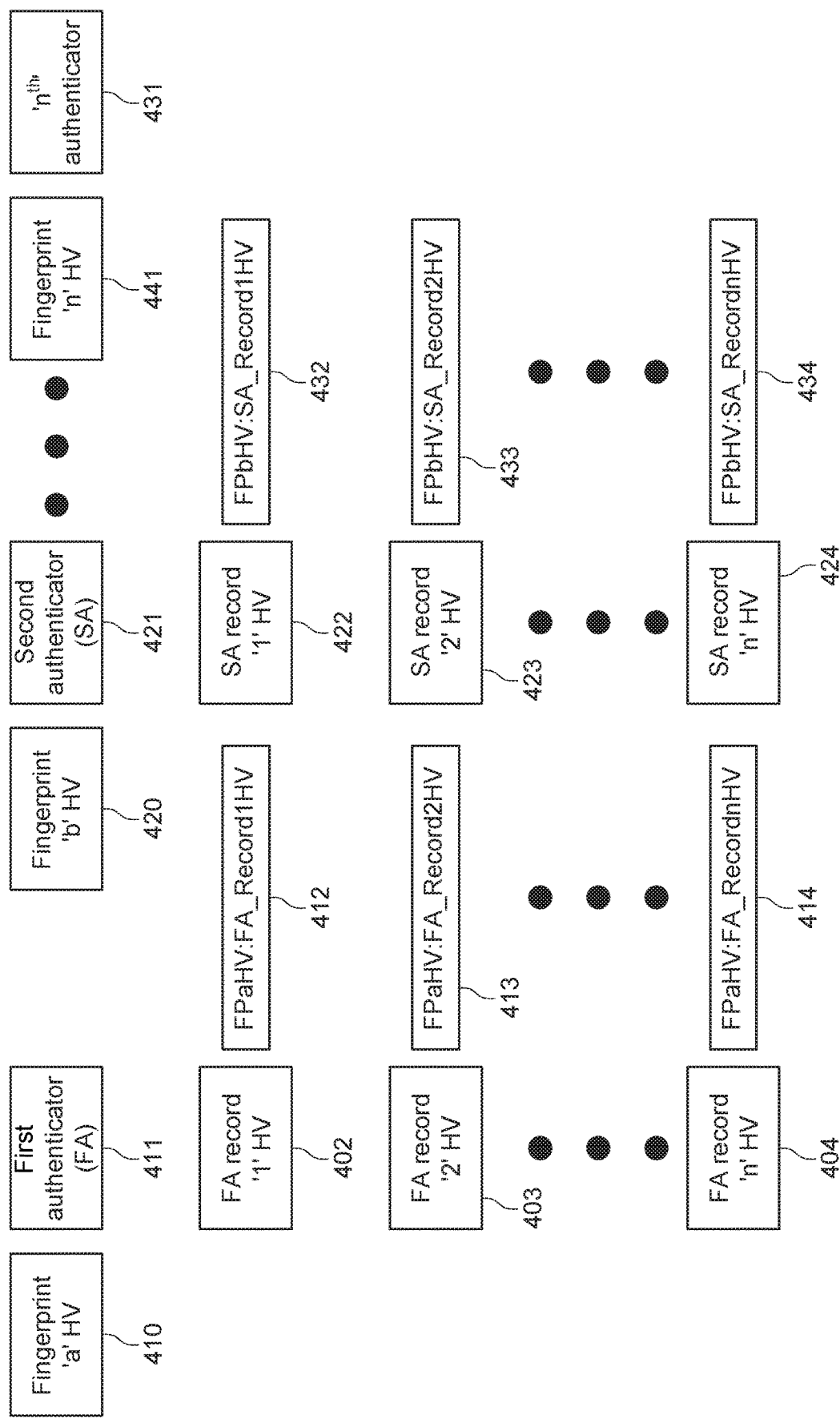
FIG. 4 illustrates an exemplary process for assigning ownership to memetic authenticators in accordance with an embodiment of the present design.

Referring to FIG. 4, illustrated is an exemplary process for assigning ownership to avatar and totem authenticators within the system. As part of the identity provider curation process, refer to FIG. 5, the identity provider may apply a hashing function for generating a one-way hash value for each record within a rendered standardized memetic authenticator. In addition, the identity provider may associate a unique fingerprint hash value 350 (FIG. 3) to each record hash value (e.g., discrete image frame hash value) contained in the authenticator. On associating the fingerprint hash value, the identity provider may store the fingerprint hash value paired with each authenticator's record hash value on the distributed database. On storing, the authenticator is curated wherein the associated fingerprint hash value affirms the authenticator, and subsequent records, are owned by the identity provider.

In one embodiment the present design may configure a blockchain type of distributed ledger database for storing the curated authenticators. The exemplary process for assigning ownership to avatar and totem authenticators, illustrated in FIG. 4, will be disclosed in terms of submitting transaction records for verification onto the distributed ledger database although the design is not so limited. The present design may configure an association processing mechanism in an arrangement for associating a fingerprint hash value paired with authenticator's record hash value(s). The association processing mechanism may provide for associating a first authenticator (FA) 411, for example an avatar, with a unique fingerprint 'a' HV 410 wherein first authenticator FA 411 may include FA Record '1' HV at 402, FA Record '2' HV at 403, through FA Record 'n' HV at 404. On associating first authenticator (FA) 411 with fingerprint 'a' HV 410 the association mechanism may generate a transaction record for the first association FPaHV:FA_Record1HV at 412, a transaction record for the second association FPaHV:FA_Record2HV at 413, and a transaction record for the "nth" association FPaHV:FA_RecordnHV at 414 wherein the format of the transaction records is:

"Fingerprint 'X' HV: Record 'Y' HV".

Continuing on, the present design's association processing mechanism may provide for associating a second authenticator (SA) 421, for example a totem, with a unique fingerprint 'b' HV 420 wherein second authenticator (SA) 421 may include SA Record '1' HV at 422, SA Record '2' HV at 423, through SA Record 'n' HV at 424. On associating second authenticator (SA) 421 with fingerprint 'b' HV 420 the association processing mechanism may generate a transaction record for the first association FPbHV:SA_Record1HV at 432, a transaction record for the second association FPbHV:SA_Record2HV at 433, and a transaction record for the "nth" association FPbHV:SA_RecordnHV at 434. The association processing mechanism may continue until "nth" authenticator 431 has been associated with fingerprint HV 'n' 441.

The identity provider may submit each transaction record generated by the present design's association processing mechanism for verification on the distributed database where verified transactions are added to the transaction history and distributed/replicated across all database nodes for storing. Accordingly, the authenticators are curated and available for use, for example being acquired by a user, wherein the storing of the fingerprint-with-authenticator association affirms the authenticator is owned by the identity provider. During acquisition the association mechanism is repeated where the identity provider fingerprint is replaced by the acquiring client device's fingerprint. On recording these new pairings (e.g., associations) the verified transactions added to transaction history will reflect the transfer in ownership from the identity provider to the user's client device.

Figure 5:
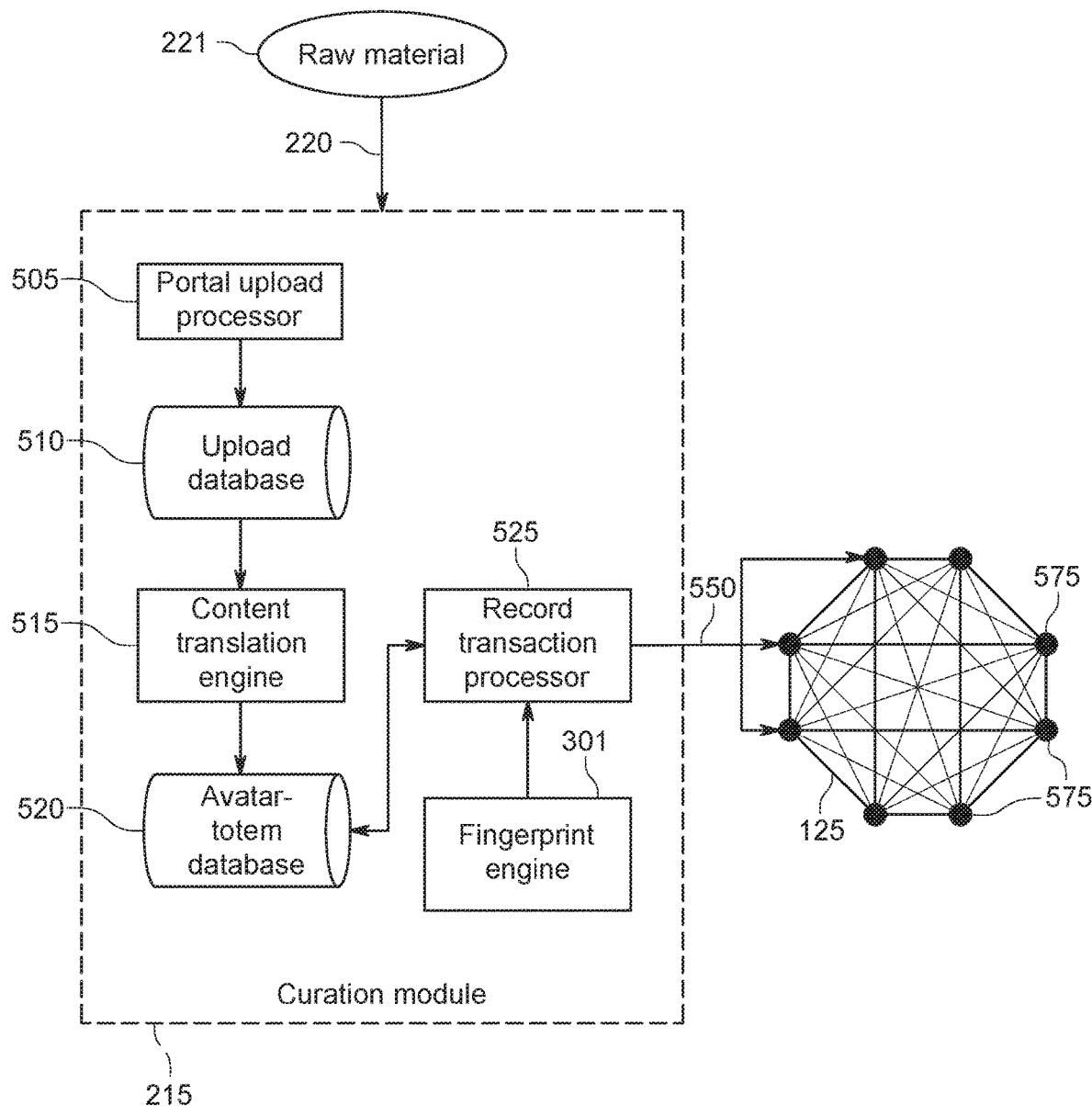
FIG. 5 illustrates an exemplary process flow for curating and storing memetic authenticators with an identity provider in accordance with an embodiment of the present design.

FIG. 5 illustrates an exemplary process flow for curating and storing authenticators with an identity provider in accordance with one embodiment of the present design. In order for the system to operate, the raw materials for generating avatars and totems are curated into useable authenticators available for issuing to users of the system.

Curation module 215 may involve an upload mechanism to receive digital content in the form of a digital video or an animation as a raw material 221 originating from a large number of external users or services. In general, raw material 221 digital content is typically created and supplied by crowd-sourcing services. The present design portal upload processor 505 may configure an algorithm in an arrangement for receiving upload of raw material 221, at 220. The portal upload processor 505 may include functionality equivalent to that found in current designs such as YouTube, Instagram, and SnapChat and should be well understood by one skilled in the art. On receiving an upload, portal upload processor 505 may store the raw material digital content in an upload database 510.

Portal upload processor 505 may configure processing for staging the start, buffering the data, error control including restarting on interruption for controlling the flow of data during collection of raw material 221. In short, the present design upload mechanism executes the functionality necessary for receiving digital content submissions over the Internet from individual amateurs, third-party professionals, and stock content created from other identity providers.

A content translation engine 515 may configure an algorithm for converting the uploaded raw material 221 to render predefined standardized authenticators (e.g., avatars and totems). Content translation engine 515 may include normalizing the uploaded raw materials to a common format (e.g., aspect ratio, or resolution, or duration, or rate, or length, or data elements, or encoding, and/or combinations thereof). Normalizing may include maintaining a constant number of bits per pixel of the video or animation stream, maintaining a constant number of pixels for displaying the horizontal width and displaying the vertical length for each frame, and maintaining a constant frame duration time between the beginning and ending of each frame. Content translation engine 515 may include partitioning the normalized content into one or more discrete records in a sequence. For example, content in the form of digital video and animations, such as a graphical interchange format (GIF) file, include a series of digital images, as frames, that may be rendered in rapid succession. The method may include extracting each frame into a separate record and indexing each record for storing in avatar-totem database 520 (FIG. 5) while maintaining the sequence of records. For example, the records may involve tag image file format (TIFF), bitmapped images and like formats. Content translation engine 515 may include embedding hidden information within the frames (e.g., steganography techniques including a fingerprint, or serial number, or watermark, or authenticator provenance, and/or combinations thereof). Content translation engine 515 may include reconstructing the partitioned sequence of discrete frames into a single animated image file. The algorithm may include reading and importing the desired sequence of records, such as image1.tif, image2.tif, image3.tif, and so forth, and write the entire sequence into an animated image file, such as a '.gif'. '.png', or '.apng' file and equivalent lossy or lossless bitmap image format. On rendering, content translation engine 515 may store the partitioned discrete frames in an avatar-totem database 520. On reconstructing, content translation engine 515 may store the animated image file(s) in a multimedia container in avatar-totem database 520.

At this point the uploaded raw material(s) have been rendered into their memetic authenticator form and partitioned into discrete records ready for storing on a distributed database. A record transaction processor 525 may configure an algorithm in an arrangement for extracting each discrete record derived from the rendered raw materials stored in avatar-totem database 520. Accordingly, on extracting, record transaction processor 525 may apply a one-way hashing function, or like hashing method, to each discrete record for generating a hash value derived from each record. Curation module 215 may configure fingerprint engine 301 for generating a unique fingerprint (refer to FIG. 3) and record transaction processor 525 may associate the fingerprint with a hash value for each authenticator. In the situation where an authenticator involves a plurality of discrete record hash values, the present design may associate the same fingerprint to each hash value (refer to FIG. 4). In the situation involving a plurality of authenticators, the present design may apply a different fingerprint for use with each authenticator and its subsequent discrete record values.

On associating, record transaction processor 525 may submit each authenticator's fingerprint hash value and record hash value pair(s) as a transaction record for verification onto the distributed database such as identity network 125. The submitting may involve broadcasting the generated fingerprint hash value and record hash value pair(s) to multiple network nodes 575, at 550, as transaction records for verification onto the distributed database.

The present design curation processing method for rendering the standardized authenticator(s) from raw material(s) may be analogous to that found in previous designs for cryptocurrency mining (e.g., Bitcoin and Ethereum networks). In the blockchain-enabled embodiment, the present design curation processing method may involve proof-of-work, proof-of-stake, or like transaction record mining techniques that typically involve finding a hash value that matches the current target and then broadcasting the resultant block across the network to each node to validate and ultimately add the block to their copy of the distributed ledger. The underlying transaction record verification and recording details involving time-stamping, hashing, incrementing a serialized value, matching, and other blockchain-related functionalities are typically well known to those knowledgeable and skilled in the art.

On successful verification by identity network 125, the newly created transactions are distributed across all the identity network nodes, such as network nodes 575, and entered on the locally stored database. The curation module 215 may store a local copy of its fingerprint hash value and hash values for each authenticator's discrete records.

Associating an identical identity provider server 103 (FIG. 1) fingerprint with each authenticator in this way assigns the ownership of the curated authenticators to the identity provider. In short, the present disclosure curation processing creates a transaction record for storage in a distributed database for each authenticator. Curation module 215 may publish the avatar and totem authenticators stored in avatar-totem database 520, in their reconstructed animation file format, to public online application stores such as Google Play Store 201 (FIG. 2), Apple Store 202 (FIG. 2), or other third parties. On publishing, users of the system may acquire available avatars and totems by downloading the file(s) from the online public application stores during acquisition/issuing.

Figure 6:
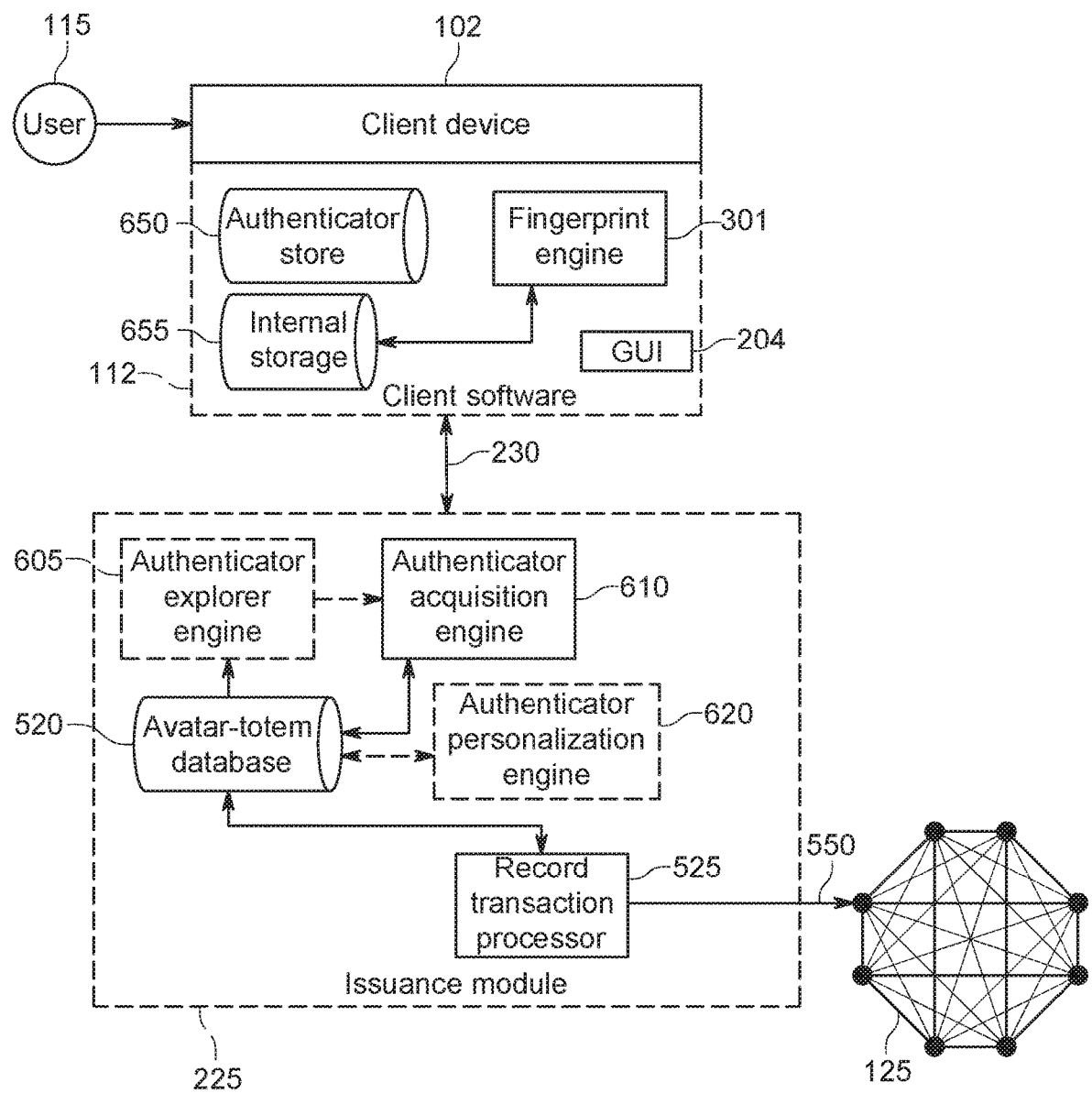
FIG. 6 illustrates an exemplary process flow for issuing memetic authenticators from an identity provider to a user or computer process in accordance with an embodiment of the present design.

Referring to FIG. 6, illustrated is an exemplary process flow for issuing an authenticator from an identity provider to a user in accordance with one embodiment of the present design. In general, issuance module 225 may provide users the ability to peruse and consider the available avatars and totems for use as their authenticators. User 115 may browse and select at least one available authenticator by connecting client device 102 to an identity provider, at 230, wherein client software 112 establishes a secure connection with authenticator acquisition engine 610 within issuance module 225. Authenticator acquisition engine 610 may configure an algorithm in an arrangement for presenting, at 230, the avatar and/or totem authenticators, stored in avatar-totem database 520 during curation processing, available for selection by user 115 via GUI 204.

In an embodiment, authenticator explorer engine 605 may configure an algorithm in an arrangement for searching the available authenticators to aid the users in reviewing options and making their selection. For example, the user may desire to only consider avatars that represent animal caricatures. On the user submitting a search submission containing a request for 'animal caricatures' authenticator explorer engine 605 may query avatar-totem database 520 catalog to locate, access, and retrieve avatars and totems that meet the submitted search criteria. Authentication explorer engine 605 may forward the results returned from the query to authenticator acquisition engine 610. Authenticator acquisition engine 610 may present, at 230, the available 'animal caricature' related avatar and/or totem authenticators available for section by user 115 via GUI 204.

In an embodiment, authenticator personalization engine 620 may configure an algorithm in an arrangement for providing facilities for user 115 to customize, personalize, and tailor their acquired avatars and totems wherein the customizations may include digital manipulation such as simple graphical modifications or more advanced augmented reality techniques. Authenticator personalization engine 620 may apply user inputted modifications to selected avatars and totems and store the modified versions in avatar-totem database 520. In a further embodiment client software 112 may configure like avatar and totem modification facilities as disclosed for authenticator personalization engine 620. In this embodiment client software 112 may send, at 230, the modified avatar and/or totem modified versions to issuance module 225. Issuance module 225 may translate, referring to FIG. 5, each user customized authenticator using curation module 215 facilities previously disclosed and store the modified discrete frames in avatar-totem database 520. Record transaction processor 525 may re-generate new hash values for each modified frame. Record transaction processor 525 may create a new transaction record for each modified authenticator and submit for verification on identity network 125.

User 115 may select their desired avatar or totem and commit to its acquisition. On selecting, user 115 may submit a request for acquiring their selected authenticator from client software 112, at 230, to authenticator acquisition engine 610. On receiving the request, authenticator acquisition engine 610 may request a fingerprint from client software 112. Client software may configure fingerprint engine 301 and dynamically generate a fingerprint, referring to FIG. 3, and send the unique fingerprint hash value in response to the request. In one embodiment, fingerprint engine 310 stores the hardware signature, software signature and serialized identifier as inputs required to re-generate the fingerprint, as required or dynamically just-in-time, in an internal storage 655.

Accordingly, on receiving the fingerprint hash value, authenticator acquisition engine 610 may send and transfer the selected raw images belonging to the avatar or totem to client software 112 in exchange for the fingerprint hash value. On receiving the selected avatar or totem, client software 112 may store the received authenticator raw images locally in authenticator store 650.

Accordingly, on receiving the fingerprint hash value, authenticator acquisition engine 610 may store the received fingerprint hash value with the acquired authenticator, e.g., record hash values, and may mark the acquired authenticators as 'pending-acquired' in avatar-totem database 520. Marking avatars and totems as 'pending-acquired' removes them from circulation, rendering them unavailable for acquisition by other client nodes. In one embodiment users acquire avatars and totems independently at different times and in any order.

On marking authenticator as 'pending-acquired' in avatar-totem database 520, record transaction processor 525 may configure an algorithm in an arrangement for creating new transaction record(s) for each authenticator's record hash value(s) stored in avatar-totem database 520 paired with the received fingerprint hash value from client software 112 during acquisition.

Record transaction processor 525 may associate the received fingerprint hash value with at least one record hash value for the acquired authenticator. In the situation where the acquired authenticator involves a plurality of record hash values, the present design may associate the received fingerprint hash value to each record hash value, referring to FIG. 4. On associating, record transaction processor 525 may submit each fingerprint hash value and record hash value(s) for the acquired authenticator, at 550, as a new transaction record for verification onto the distributed database such as identity network 125. On verifying, the new transactions containing these new records reflect the transfer in authenticator ownership on the distributed database. For example, referring to FIG. 4, the original transaction record containing the pairing 'FPaHV:FA_Record1HV' is updated and replaced with 'FPuHV:FA_Record1HV' where FPu is the acquiring user's 'client' fingerprint hash value exchanged for the authenticator during acquisition. Accordingly, the identity provider's 'server' fingerprint hash value is updated and replaced with the user's 'client' fingerprint hash value for the remaining discrete record hash values belonging to this authenticator to complete the transfer of ownership.

In short, issuance module 225 may transfer ownership of the authenticator(s) requested by the user wherein the transfer is accounted for and tracked by recording the transfer on the distributed database over network 125. On successfully recording the transfer the issuance module 225 may mark the acquired authenticators as 'acquired' in avatar-totem database 520. Marking avatars and totems as 'acquired' may permanently remove them from circulation and may result in destruction of original raw materials.

In one embodiment avatars and totems are not directly connected or linked to each other when stored in authenticator store 650 or by any other form within client device 102. In one embodiment the disclosed method for assigning and/or associating of a fingerprint to an avatar or totem provides such a connection or linking.

Figure 7:
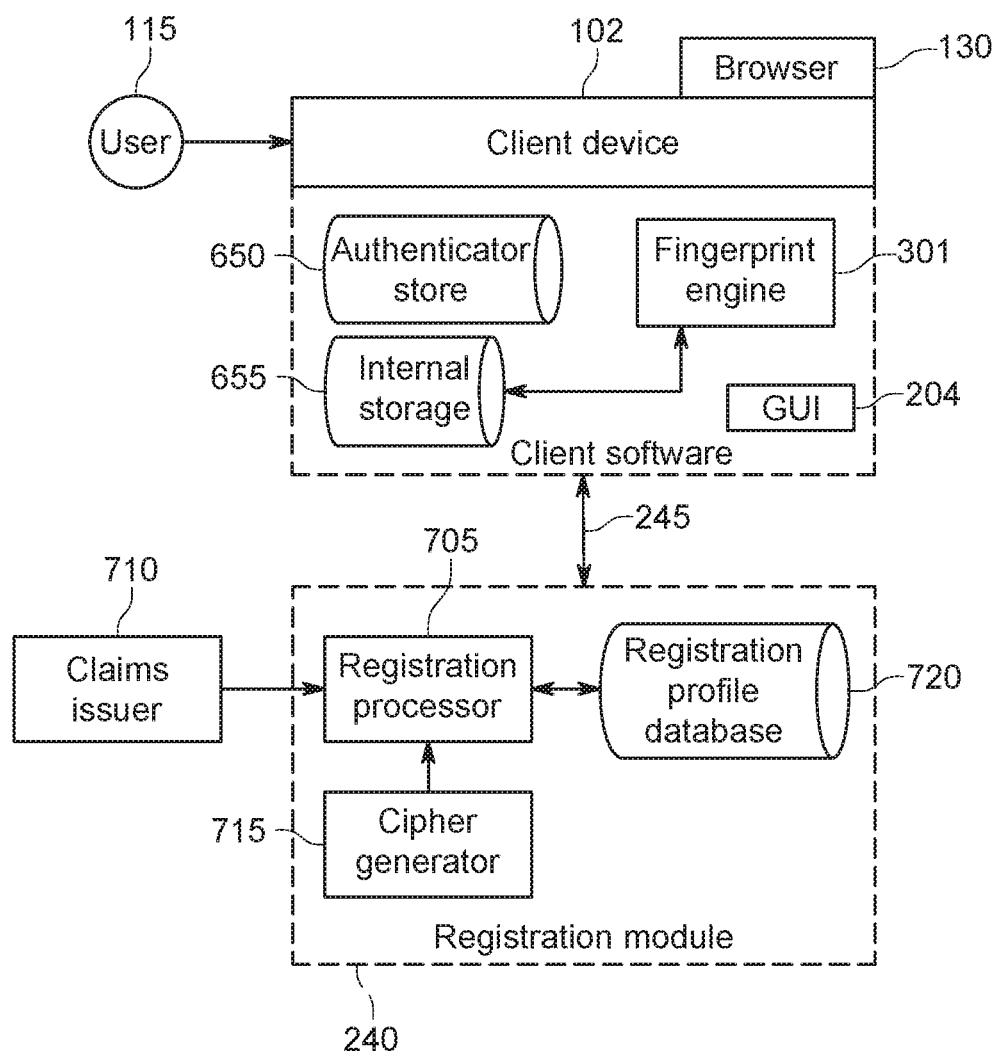
FIG. 7 illustrates an exemplary process flow for registering system users with a memetic authentication enabled service provider in accordance with an embodiment of the present design.

FIG. 7 illustrates an exemplary process flow for registering system users with a memetic authentication enabled service provider in accordance with one embodiment of the present design. User 115 seeking to interact with the applications and services offered by a particular service provider must first register with the service provider. During the enrollment process registration module 240 may configure the use of memetic authenticators for granting access. In general, registration module 240 and may receive access enrollment requests, at 245, from user 115. On completing enrollment, client software 112 may assign a memetic authenticator to a service provider for use when requesting access.

User 115 may begin the enrollment process by invoking client device 102 native browser 130 application such as Google Chrome, Mozilla Firefox, or like capability for navigating to the service provider website. Registration module 240 may configure a registration processor 705 in an arrangement for receiving enrollment information provided by user 115, at 245. In an embodiment registration module 240 may configure an algorithm in an arrangement for presenting an online webpage form where the user populates the form by entering their enrollment information. Typically, an enrollment request may include the person or entity's name, physical address, and other unique identifying characteristics and identification claims.

Registration processor 705 may provide for automating a mechanized enrollment processing facility for receiving and digesting a machine-readable statement from an external claims issuer 710. Claims issuer 710 may involve an external source for providing a verifiable claim, or credential, attesting to the user's identity based on their established, vetted, and trusted registration profile. For example, the user may assert a verifiable claim previously acquired from the United States Post Office that asserts their physical address.

In an embodiment, at any point during the registration process, registration processor 705 may solicit from user 115 additional verifiable claims in order to further vet the authenticity of the user's claimed identity and increase overall identification assurance. The enrollment information may be captured in an XML format and stored in an XML database to aid in the interchange of data between identity providers and message with disparate systems. In a further embodiment soliciting additional verifiable claims may provide for linking additional user information that may be required to provide services to the user. For example, a user may possess a verifiable claim from the United States Post Office asserting their physical mailing address, which a service provider's ecommerce application could rely on for shipments without requiring a copy of the address data to locally persist in registration profile database 720. The acquisition and use of verifiable claims should be well understood by those skilled in the art.

On populating their entries, user 115 may complete and submit their registration request. On submitting, registration processor 705 may receive the enrollment request, at 245, and create a user's registration profile from the supplied enrollment information and store this profile locally in a registration profile database 720.

Registration processor 705 may associate a unique zero-knowledge cipher for each user and issue the cipher to client software 112. Registration processor 705 may store the associated cipher with the received user enrollment information in registration profile database 720. In one embodiment the cipher may involve a simple pseudorandom string, or could include special instruction such as indicating use of a particular symmetric encryption function. On receiving the issued cipher, at 245, client software 112 may store the cipher in internal storage 655.

In accordance with an aspect of the present disclosure registration module 240 may generate the cipher by a local cipher generator 715 process. Cipher generator 715 may configure an algorithm in an arrangement for generating zero-knowledge ciphers following a pre-assigned specific cryptographic protocol (e.g., a symmetric cipher such as AES, 3DES, Blowfish, Twofish, and the like). In a further aspect cipher generator 715 may retrieve zero-knowledge ciphers from the identity network, not illustrated in FIG. 7, where the cipher has been previously curated by an external service. In this arrangement, the external service may curate ciphers using a method analogous to that previously disclosed for curating avatars and totems. On issuing the cipher, registration processor 705 may request a fingerprint hash value from the client software 112, at 245, in accordance with an aspect of the present deign.

On receiving the cipher, at 245, client software 112 may prompt the user, via GUI 204, to select an avatar, previously issued and stored in authenticator store 650, for assignment with the issuing service provider's native software application or service. Client software 112 may retrieve from authenticator store 650 a plurality of previously acquired avatars and present an icon, via GUI 204, for representing each avatar to the user available for selection. The user may choose their desired avatar by simply using a tapping gesture or a swiping motion to select the icon representing their chosen avatar for use with this service provider. Client software 112 may invoke fingerprint engine 301 for retrieving the appropriate fingerprint raw materials, linked to the avatar during issuing (e.g., when acquired), from internal storage 655. Fingerprint engine 301 may generate a fingerprint from the retrieved raw materials and generate the appropriate fingerprint. Client software 112 may associate the fingerprint with the received service provider's issued cipher and store the associated cipher in internal storage 655 with the fingerprint raw materials and linked with avatar raw images stored in authenticator store 650. On successful storing, client software 112 may communicate with registration module 240, at 245, sending the fingerprint hash value associated with the specific avatar chosen previously by user 115.

On receiving the fingerprint hash value, registration processor 705 may append the received fingerprint hash value to the previously locally-stored user registration profile, containing the associated cipher and enrollment/registration information in registration profile database 720.

The user may repeat the registration process for each service provider they desire to access. In the situation where a user desires to access one or more individual applications from a set of applications offered by the service provider, the registration processing is repeated where the user may assign a different avatar to each distinct application to which they desire access. In this arrangement, the service provider may store a unique cipher and fingerprint hash value for each application with the user's profile(s).

In accordance with one embodiment, the present design may configure the system in an arrangement for preventing the identity provider(s) from acquiring knowledge of, receiving, reading or storing the service provider issued cipher(s) at any time. In accordance with a further aspect of the embodiment, the service provider will at no time possess and/or retain the user's avatar(s) and/or totem(s) in any form including the animated image form, individual image frames, or hash values thereof.

Figure 8:
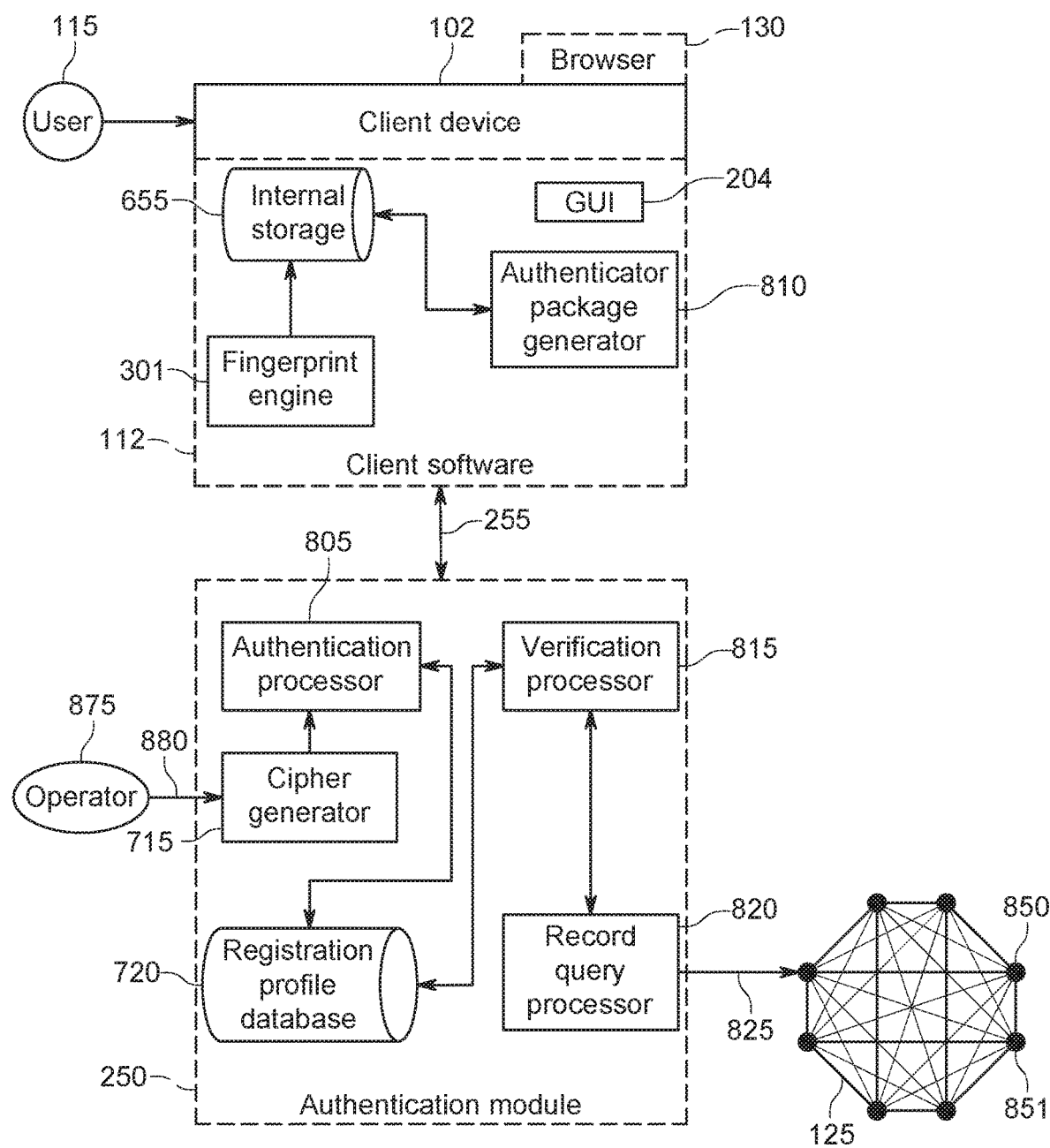
FIG. 8 illustrates an exemplary process flow for authenticating a user with a service provider in accordance with an embodiment of the present design.

FIG. 8 illustrates an exemplary process flow for authenticating a user with a service provider in accordance with an embodiment of the present design. On registration with a service provider, user 115 seeking to access a service provider's website service, or underlying software application, may gain access by authenticating using the system. User 115 may enter a uniform resource locator (e.g., link) into browser 130 and navigate to the service provider's website or may select the service provider by clicking on an appropriate icon, via GUI 204 representing the service provider. On navigating, or selecting, client software 112 may initiate an authentication event and send the appropriate avatar-linked fingerprint hash value, at 255, based on the previously made user assignment during the registration processing. Fingerprint engine 301 may dynamically generate the appropriate fingerprint from the raw materials stored locally in internal storage 655 and subsequent fingerprint hash value. On receiving the fingerprint hash value, authentication processor 805 may configure an algorithm in an arrangement for generating and sending, at 255, a challenge request message to client software 112. On receiving the challenge request, client software 112 may prompt user 115 requesting they authenticate. The prompting may involve displaying, via GUI 204, a list of all the user's acquired animated avatars alongside a list of all their animated totems. User 115 may form their authentication response by selecting the correct avatar and totem from a randomly displayed list of avatars and totems, via GUI 204. In one arrangement the user may either input a swiping motion as a connecting gesture to select the avatar-totem pair or in another arrangement the user may input a tapping gesture on the desired avatar followed by a tapping gesture on the desired totem to form their selection. In either selection arrangement, GUI 204 may capture the discrete record displaying at the instant of selection for the animated avatar and capture the discrete record displaying at the instant of selection for the animated totem. On capturing, client software 112 may form the avatar-totem pairing ready for use in assembling an authenticator package.

In situations where a higher degree of assurance is desired, authentication processor 805 may request a specific image frame 'X' for the avatar and specific image frame 'Y' for the totem, at 255, from client software 112. Authentication processor 805 may randomly nominate the values for the requested 'X' and 'Y' image frames, for example avatar frame 5 and totem frame 3. Accordingly, on receiving the specific images frame request client software 112 may query/search internal storage 655 and retrieve the specified 'X' avatar and 'Y' totem discrete records, ready for use in assembling the authenticator package. In this arrangement the selection of records is mechanized by client software 112 and no user interaction (e.g., prompting) is needed for responding to the request.

On the image frame capturing or mechanized retrieving, an authenticator package generator 810 may configure an algorithm in an arrangement for assembling a memetic authenticator package (e.g., authentication response). The memetic authenticator package may include the fingerprint associated with the authenticator during acquisition, captured avatar discrete record, captured totem discrete record, and a timer value. Client device 102 never stores hash values for fingerprints or authenticator records locally. Authenticator package generator 810 may encrypt the memetic authenticator package using the service provider issued cipher associated with the user's client device fingerprint. The fingerprint-cipher association was made during the registration processing and stored in internal storage 655. Authenticator package generator 810 may send the encrypted memetic authenticator package to verification processor 815, at 255.

In a further embodiment authentication processor 805 may, during a user's session, aperiodically request either manual or mechanized another avatar-totem pair for episodic re-verification. On receiving an episodic re-verification request, User 115 may select another avatar-totem frame pair from the randomly displayed lists or in the situation where specific frames are requested client software may automatically retrieve the specified frames, for use by authenticator package generator 810 for assembling a new memetic authenticator package response and sending the package to verification processor 815, at 255.

On receiving, verification processor 815 may configure an algorithm in an arrangement for decrypting the contents using the cipher locally stored in registration profile database 720 associated with the user's avatar-linked fingerprint hash value during the registration process. In the situation where the user selects an incorrect avatar for authenticating, authenticator package generator 810 will retrieve an incorrect cipher from internal storage 655 and apply the incorrect cipher when generating and encrypting the authenticator package. Verification processor 815 will retrieve a cipher for decrypting the authenticator package from registration profile database 720 based on the supplied avatar-linked fingerprint. In this situation on decrypting, the cipher used for decrypting does not match the cipher used during encrypting and since the two ciphers do not match verification processor 815 will not be able to successfully decrypt the authenticator package.

On successful decryption verification processor 815 may validate the supplied timer value is within the service provider's expected TTL acceptable range. The service provider may assign a TTL duration based on internal policy wherein authentication module 250 may set a permissible elapsed time, e.g., minutes, hours, or days, from the timer value, e.g., timestamp, enclosed in the authenticator package in accordance with the policy. In short, the permissible elapsed time is a time-window expressing the acceptable range for valid timer values. If the timestamp falls within the specified time-window the supplied timer is valid. In situations where the timestamp falls outside of the specified time-window the timer is determined to be invalid. In one embodiment the timer value supplied in the authenticator package is derived from the user's client device and the entire system is reconciled to Universal Time Code.

In the situation where either the decryption process or timer validation process fail, the authentication attempt fails and the service provider denies access to user 115. In the situation where both the decryption processing and timestamp validation processing succeed the authentication processing continues to the next step for determining if the supplied avatar-totem pair belongs to user 115.

In one embodiment, record query processor 820 may configure an algorithm in an arrangement for generating and submitting a first and second query request for records stored on identity network 125, one for each fingerprint-record association asynchronously, for ensuring speed and resisting hacking. The first query may transmit a request for records containing the recorded first authenticator fingerprint-record pair and the second query may transmit a request for records containing the recorded second authenticator fingerprint-record pair from the records assembled in the authenticator package. The present design querying mechanism arrangement may determine if hash values for the received authenticator image frames, e.g., user selected avatar-totem pair, enclosed in the authenticator package match the stored hash values belong to the asserted fingerprint hash value previously stored on the distributed database when issued and ownership was transferred to user 115. On decrypting the authenticator package and prior to invoking the query mechanism, the embodiment involving an assembled memetic authenticator package using non-hashed discrete records for the captured avatar and totem, verification processor 815 may apply a hashing function for generating two hashed values, one for the enclosed discrete avatar record and one for the enclosed discrete totem record.

Record query processor 820 may provide for generating at least one first query composed of the client device fingerprint hash value and the hashed value of the avatar discrete record. In parallel (e.g., asynchronously), record query processor 820 may provide for generating at least one second query composed of the client device fingerprint hash value and the hashed value of the totem discrete record. Each query is submitted, at 825, to identity network 125 to verify that the respective hash value pairs stored on identity network 125 match the hash value pairs provided in the query.

Record query processor 820 query mechanism may configure queries in a multiparty verification arrangement for retrieving identity network-stored authenticator hash value pairs from a plurality of identity network nodes, for example, such as identity network node 850 and identity network node 851. In this arrangement verification processor 815 may compare each received node's stored authenticator hash value pair with the authenticator hash value derived from the first authenticator record and second authenticator record enclosed in the authenticator package. In this arrangement the present design may provide for multilateral verification between the service provider and the identity network where all retrieved pairs from each node must match the authenticator package supplied pair.

In the situation where the comparison process determines either the hashed values for the avatar or the totem enclosed in the authenticator package do not match the hashed values received from respective queries the authentication attempt fails and the service provider denies access to user 115. In the situation where the comparison process determines both the hashed values for the avatar and the totem enclosed in the authenticator package do match the hashed values received from the respective queries the authentication attempt succeeds and the service provider may grant access to user 115.

In one embodiment, on successful authentication and granting access, authentication processor 805 may request cipher generator 715 to create a new cipher. Authentication processor 805 may issue and send the new cipher to client software 112. Client software 112 may replace the existing cipher stored in internal storage 655 with the new cipher ready for use during the next authentication event. Authentication processor 805 may update the locally stored user profile in registration profile database 720 with the new cipher. Replacing ciphers in this way, authentication module 250 may rotate ciphers each time access is granted on a per-authentication basis in a one-time use cipher arrangement, or based on reaching a specified number of authentication events in an expiring cipher arrangement, or aperiodically. Authentication module 250 may configure an on-demand replacement facility where the cipher is updated based on receiving input from an operator 875, at 880.

In short, authentication module 250 may resolve the authentication attempt and grant access in the situation where some or all of the following conditions are satisfied:

The client provided copy of the cipher used to encrypt the memetic authenticator package matches the service provider provided copy of the cipher used to decrypt the package resulting in successful decryption of the authenticator package, and The timer timestamp value embedded in the package falls within the time-to-live (TTL) acceptable range established by the service provider, and The fingerprint associated with the avatar frame hashed value embedded in the authenticator package matches the retrieved fingerprint associated with avatar frame hashed value from identity network 125, and The fingerprint associated with the totem frame hashed value embedded in the authenticator package matches the retrieved fingerprint associated with totem frame hashed value from identity network 125.

Authentication module 250 may resolve the authentication attempt and deny access in the situation where any of the above disclosed conditions are not met.

In summary, an embodiment provides for multilateral verification with episodic re-verification in an arrangement where:

The client device storing the raw material inputs required to generate a fingerprint, the raw images for acquired animated avatars and totems, and the cipher(s) issued from the service provider(s) linked with the assigned avatars, and The identity provider server storing a fingerprint hash value for each acquired authenticator and hash values representing each authenticator's avatar and totem discrete records, and The service provider server storing each registered client's avatar-linked fingerprint hash value and generating and storing the issued cipher(s), and The totem is neither associated directly with the avatar nor with the any of the system nodes (e.g., client device, identity provider server, and service provider server).

The system linkage mechanism for the totem is through the fingerprint where the correct combination of fingerprint and totem must be replayed by the user operating client device 102 and verified by the service provider and verified from records stored on the identity network.

In this arrangement neither the client device/node, nor the identity provider server, nor the service provider server possess at any point in time all of the elements and/or components required for realizing the present design method and system for memetic authentication and identification.

Although described herein for the human-to-machine scenario, machine-to-machine scenarios are possible. For example, client device 102 may include applications, services, or micro-services in communication with other like applications, services, or micro-services.

Figure 9:
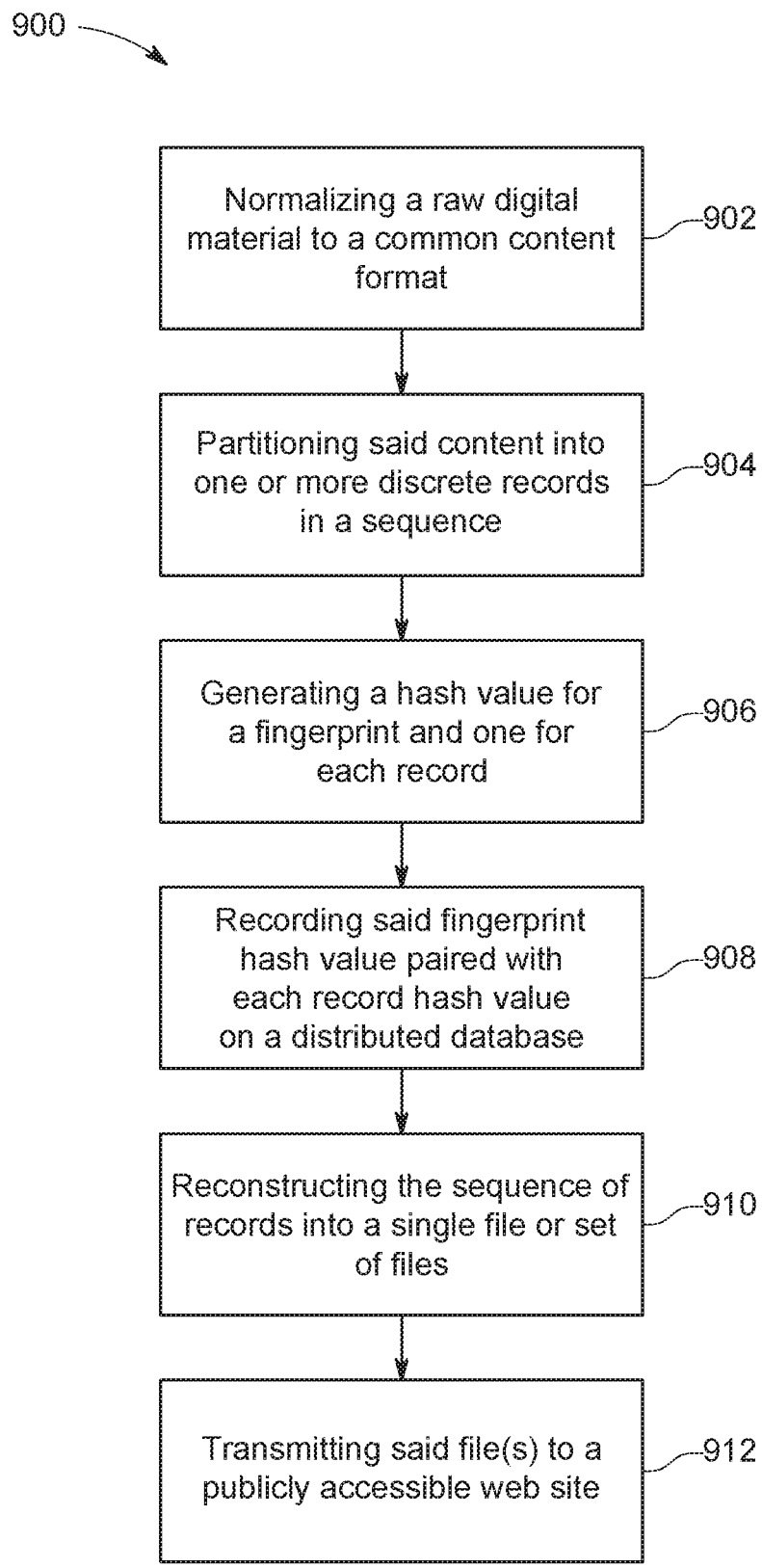
FIG. 9 is a flowchart illustrating a method for curating memetic authenticators in accordance with an aspect of the present design.

Referring now to FIG. 9, a method 900 for curating memetic authenticators in accordance with an aspect of the present design includes, at 902, normalizing raw digital material to a common content format. For example, in an aspect, an identity provider server 103 (FIG. 2) may receive raw material 221 (FIG. 5) in the form of a digital video or an animation from external services over the Internet.

At 902, the method may include normalizing the aspect ratio, resolution, duration, rate, length, data elements, or encoding of the digital video or animation to realize materials in a common format. For example, the method may include staging the start, buffering the data, and error control, including restarting on interruption, for controlling the flow of data during collection of raw material 221 (FIG. 5). The method may include maintaining a constant number of bits per pixel of the video or animation stream, maintaining a constant number of pixels for displaying the horizontal width and displaying the vertical length for each frame, and maintaining a constant frame duration time between the beginning and ending of each frame, and/or combinations thereof.

In an aspect, the method may further include embedding hidden information within each frame using a variety of steganography techniques. For example, the method may include embedding a unique key, or serial number, or watermark, or authenticator provenance, and/or combinations thereof.

At 904, the method may include partitioning the content into one or more discrete records in a sequence. For example, content in the form of digital video and animations, such as a graphical interchange format (GIF) file, include a series of digital images, as frames, that may be rendered in rapid succession. The method may include extracting each frame into a separate record and indexing each record for storing in avatar-totem database 520 (FIG. 5) while maintaining the sequence of records. For example, the records may involve tag image file format (TIFF), bit-mapped images and like formats. Non-visual memetic authenticators are typically from device or application log entries or other such application behavioral signatures, where each entry comprises separate indexed records available and ready for rendering and storing in avatar-totem database 520.

At 906, the method may include generating a hash value for a fingerprint and one for each indexed record, e.g., image frame or log entry. In an aspect, the method may include combining a hardware signature identifier and software signature identifier, derived from identity provider server 103 (FIG. 2), with a serial identifier, such as a pseudorandom string, into a variable-length string unique key, or fingerprint. The method may include applying a hashing function to the variable-length string unique key, or fingerprint, and to each indexed record for generating hash values thereof. In an aspect, the method may include pairing the fingerprint hash value joined with each indexed record hash value for generating a plurality of indexed record hash values belonging to the identical fingerprint.

At 908, the method may include storing the fingerprint hash value paired with each indexed record hash value on a distributed database. In an aspect, the method may include preparing each 'fingerprint hash value-indexed record hash value' pair and distributing for storage across a distributed infrastructure such as a blockchain type of distributed ledger database. In general, preparing may involve encrypting each pair, generating a hash value for each pair, replicating a plurality of copies for each pair, and distributing the replicated pair to geographically dispersed storage nodes on identity network 125 (FIG. 5). For example, each stored pair is recorded as a transaction on a distributed ledger database including where the pair is stored and the hash value for the pair.

At 910, the method may include reconstructing the sequence of indexed records into a single file. The method may include reading and importing the desired sequence of indexed records, such as image1.tif, image2.tif, image3.tif, and so forth, and write the entire sequence into an animated image file, such as a '.gif'. '.png', or '.apng' file and equivalent lossy or lossless bitmap image format. The method may store each reconstructed animated image file in a multimedia container in avatar-totem database 520 (FIG. 5).

At 912, the method may include transmitting the single file, animated image, or log file, to a publicly accessible website. The method may include sending a copy of the reconstructed raster graphic rendered animated image file, representing a standardized avatar or totem authenticator, to a public online application store such as Google Play Store 201 (FIG. 2) and Apple Store 202 (FIG. 2) or like publicly accessible web site.

Figure 10:
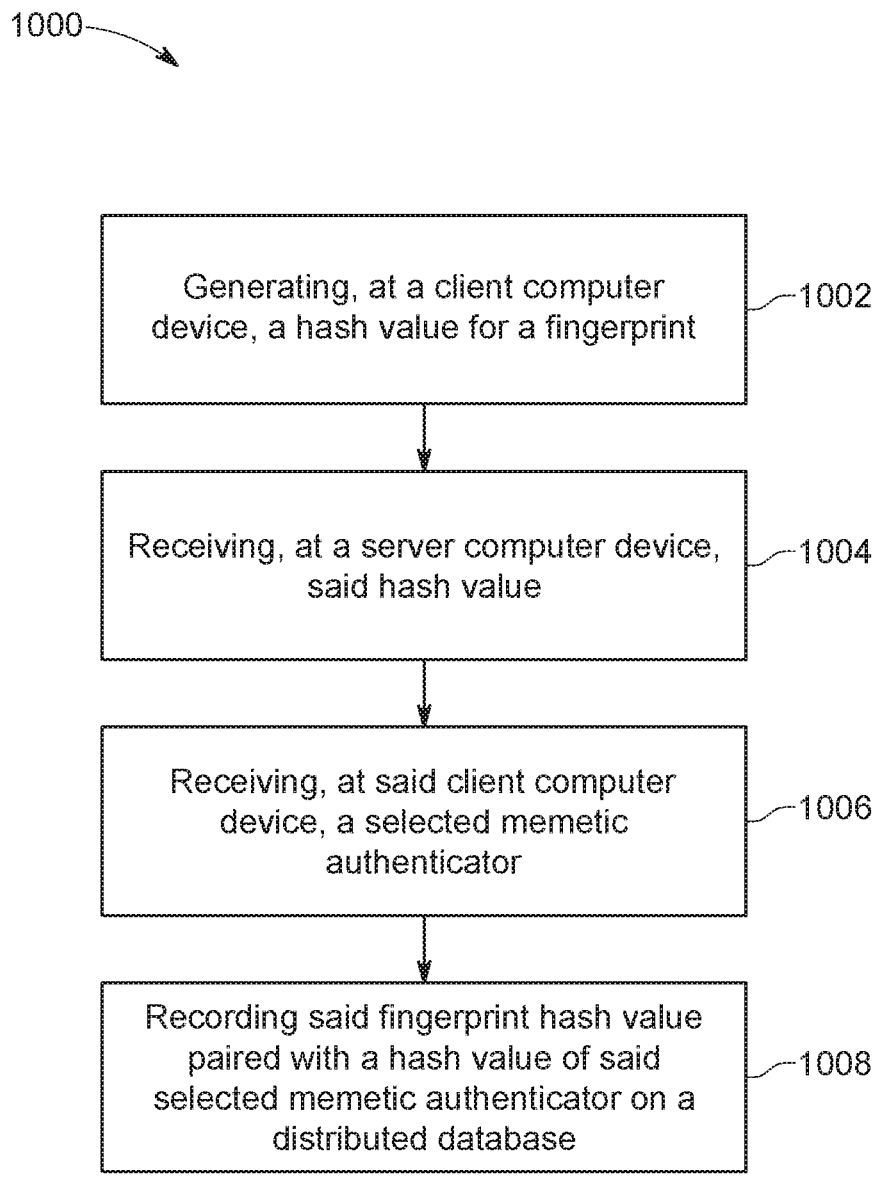
FIG. 10 is a flowchart illustrating a method for issuing memetic authenticators in accordance with an aspect of the present design.

Referring now to FIG. 10, a method 1000 for issuing memetic authenticators from an identity provider and assigning ownership to a client device in accordance with an aspect of the present design includes, at 1002 generating, at a client computer device, a hash value for a fingerprint.

At 1002, in an aspect, the method may include combining a hardware signature identifier and software signature identifier, derived from client device 102 (FIG. 6), with a serial identifier, such as a pseudorandom string, into a variable-length string unique key, or fingerprint. The method may include applying a hashing function to the variable-length string unique key to generate a fingerprint hash value.

At 1004, the method may include receiving, at a server computer device, the hash value. For example, client device 102 (FIG. 6) may send the device's fingerprint securely connecting over communications network 105 (FIG. 2) using wireless radio technology or wired cable to identity provider server 103 (FIG. 2). The method may further include sending the fingerprint from client device 102 in response to receiving a request for the fingerprint from identity provider server 103.

At 1006, the method may include receiving, at the client computer device, a selected memetic authenticator. For example, the method may include client device 102 (FIG. 6) securely connecting over communications network 105 (FIG. 2) to an identity provider's identity provider server 103 (FIG. 2) and accessing the available avatars or totems from a list of authenticators.

The human scenario visual method may include viewing a list displaying icons representing each available authenticator from avatar-totem database 520 (FIG. 6). The method may include selecting at least one desired avatar or totem authenticator from the displayed list. The method may further include sending a request for the selected authenticator from client device 102 to identity provider server 103. In response to receiving the request, the method may include sending, securely connecting over communication network 105, and transferring the selected authenticator's raw images from identity provider server 103 to client device 102 and storing locally in authenticator store 650 (FIG. 6).

The non-human scenario non-visual method may include mechanized selection of a first named set of discrete digital records representing an available memetic authenticator from a plurality of authenticator sets stored in avatar-totem database 520 (FIG. 6). The method may further include sending, securely connecting over communication network 105, and transferring the authenticator first named set of discrete digital records from identity provider server 103 to client device 102 and storing locally in authenticator store 650 (FIG. 6).

The method may include identity provider server 103 marking the acquired visual avatars and totems image frames, or non-visual first or second named set indexed records, as 'pending acquired' in avatar-totem database 520 (FIG. 6) at the time the user commits to their acquisition. The method may further include setting authenticators marked 'pending-acquired' as unavailable for acquisition by other client nodes and removing from the list of displayed authenticators available for acquisition. The method may include storing the received client device 102 fingerprint hash value associated with the acquired and non-visual memetic authenticator in avatar-totem database 520.

In an aspect, the method may further include receiving authenticator characteristics search criteria submitted from client device 102 and querying avatar-totem database 520 for available authenticators that match the submitted criteria. The method may further include presenting the matching avatars or totems for viewing in the list of displayed available authenticators.

In an aspect, the method may further include digitally manipulating the available authenticators from inputting simple graphical modifications or with more advanced augmented reality techniques and storing the manipulated versions of each discrete record in avatar-totem database 520.

At 1008, the method may include recording the fingerprint hash value paired with a hash value of the selected visual or non-visual memetic authenticator on a distributed database. In an aspect, the method may include pairing the received client device 102 (FIG. 6) fingerprint hash value joined with each indexed discrete record hash value of the selected authenticator for generating a plurality of hash pairs belonging to the identical client device 102 fingerprint.

The method may further include preparing each fingerprint hash value and indexed record hash value pair and distributing for storage across a distributed infrastructure such as a blockchain type of distributed ledger database. In general, preparing may involve encrypting each pair, generating a hash for each pair, replicating a plurality of copies for each pair, and distributing the replicated pair to geographically dispersed storage nodes on identity network 125 (FIG. 6). For example, each stored pair may be recorded as a transaction on the distributed database including where the pair is stored and the hash value for the pair. The method may include marking the acquired authenticators as 'acquired' in avatar-totem database 520 (FIG. 6), for recording the transfer of ownership from identity provider server 103 to client device 102, and may permanently remove the raw material and resulting curated authenticators from circulation.

Figure 11:
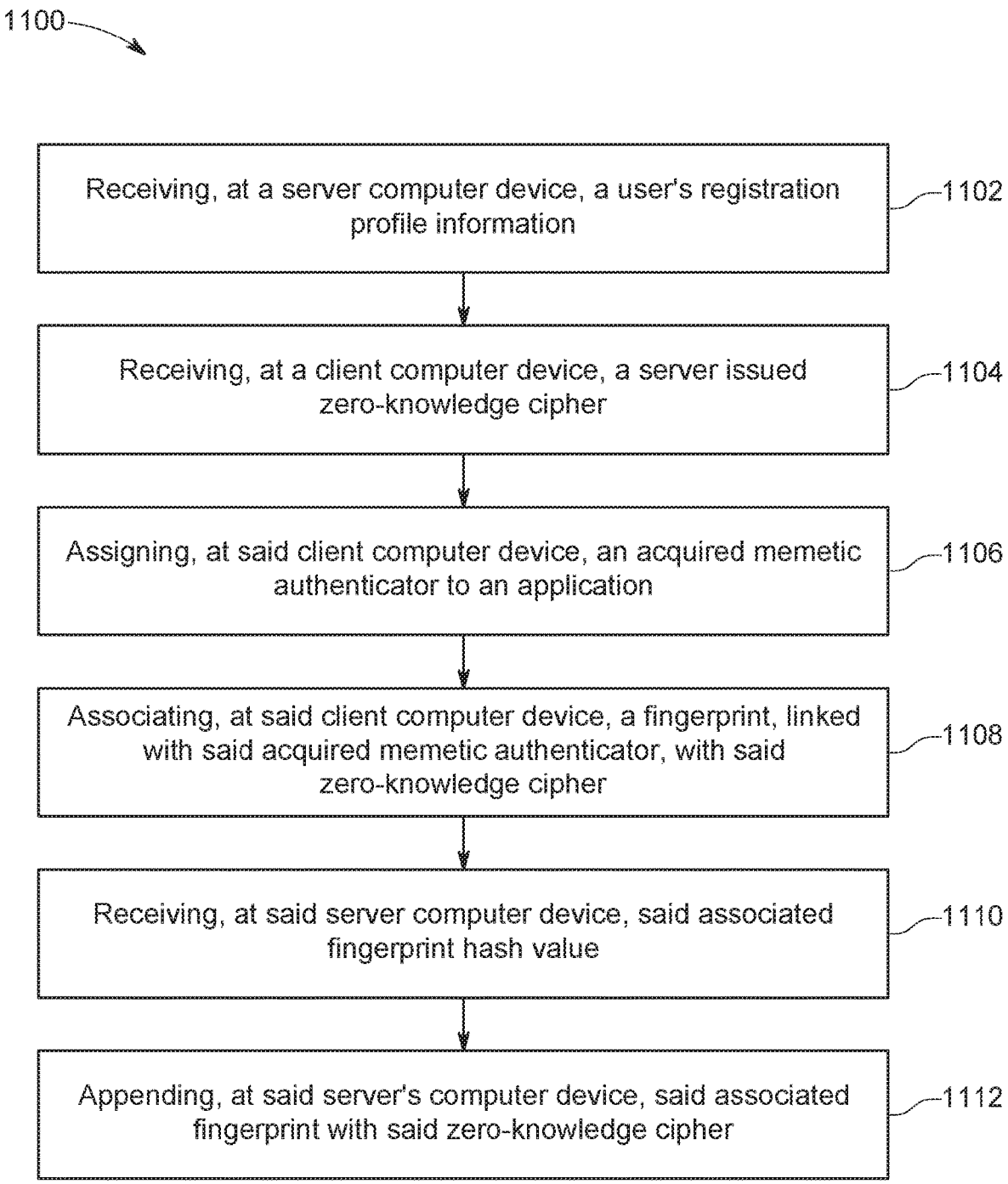
FIG. 11 is a flowchart illustrating a method for registering memetic authenticators in accordance with an aspect of the present design.

Referring now to FIG. 11, a method 1100 for registering user acquired memetic authenticators with a service provider in accordance with an aspect of the present design includes, at 1102 receiving, at a server computer device, a user's registration profile information.

At 1102, in an aspect, the method may include receiving an enrollment request from client device 102 (FIG. 7) at service provider server 101 (FIG. 2). For example, enrollment requests may include submitting enrollment information (e.g., name and address) for creating a registration profile in registration profile database 720 (FIG. 7). The method may include mechanized enrollment for non-human scenarios where enrollment request may include device hardware and software unique identifiers.

At 1104, the method may include receiving, at a client computer device, a zero-knowledge cipher issued by service provider server 101 (FIG. 2). The method may include generating unique zero-knowledge ciphers involving a simple pseudorandom string, or from a particular symmetric encryption function such as AES, 3DES, Blowfish, and the like. The method may further include associating a unique zero-knowledge cipher with each registration profile and storing the cipher in registration profile database 720 (FIG. 7).

The method may include issuing the associated cipher and sending the cipher securely connecting over communications network 105 (FIG. 2) transferring the cipher to the client device associated in the registration profile entry. The method may further include client device 102 storing the received cipher locally in internal storage 655 (FIG. 7).

In an aspect, the method may further include service provider server 101 receiving, from an external source, a plurality of unique zero-knowledge ciphers and storing locally in a database available for issuing.

At 1106, the method may include assigning, at the client computer device, an acquired memetic authenticator to an application. The human scenario visual method may include displaying a list of icons representing each acquired avatar authenticators from authenticator store 650 (FIG. 7). The method may further involve receiving a selection via gestures received at GUI 204 where on gesturing the method may capture the selected avatar icon. The non-human scenario non-visual method may include mechanized selection of a first named set from a list of memetic authenticators, e.g., visual avatar equivalent, from authenticator store 650 (FIG. 7). In either scenario the method may further include assigning the selected authenticator with service provider application software 120 (FIG. 1).

At 1108, the method may include associating, at the client computer device, a fingerprint previously linked with the acquired visual or non-visual memetic authenticator with the zero-knowledge cipher. The method may further include storing the cipher with the associated memetic authenticator in internal storage 655 (FIG. 7).

At 1110, the method may include receiving, at the server computer device, the associated fingerprint hash value. For example, a client device 102 (FIG. 2) may generate and send a hash value of the associated fingerprint securely connecting over communications network 105 (FIG. 2) using wireless radio technology or wired cable to a service provider server 101 (FIG. 2).

At 1112, the method may include appending, at the server computer device, the associated fingerprint with the zero-knowledge cipher. The method may include appending and storing a copy of the received fingerprint hash value transferred from client device 102 (FIG. 2) with the service provider server 101 (FIG. 2) previously generated and issued cipher in registration profile database 720.

Figure 12:
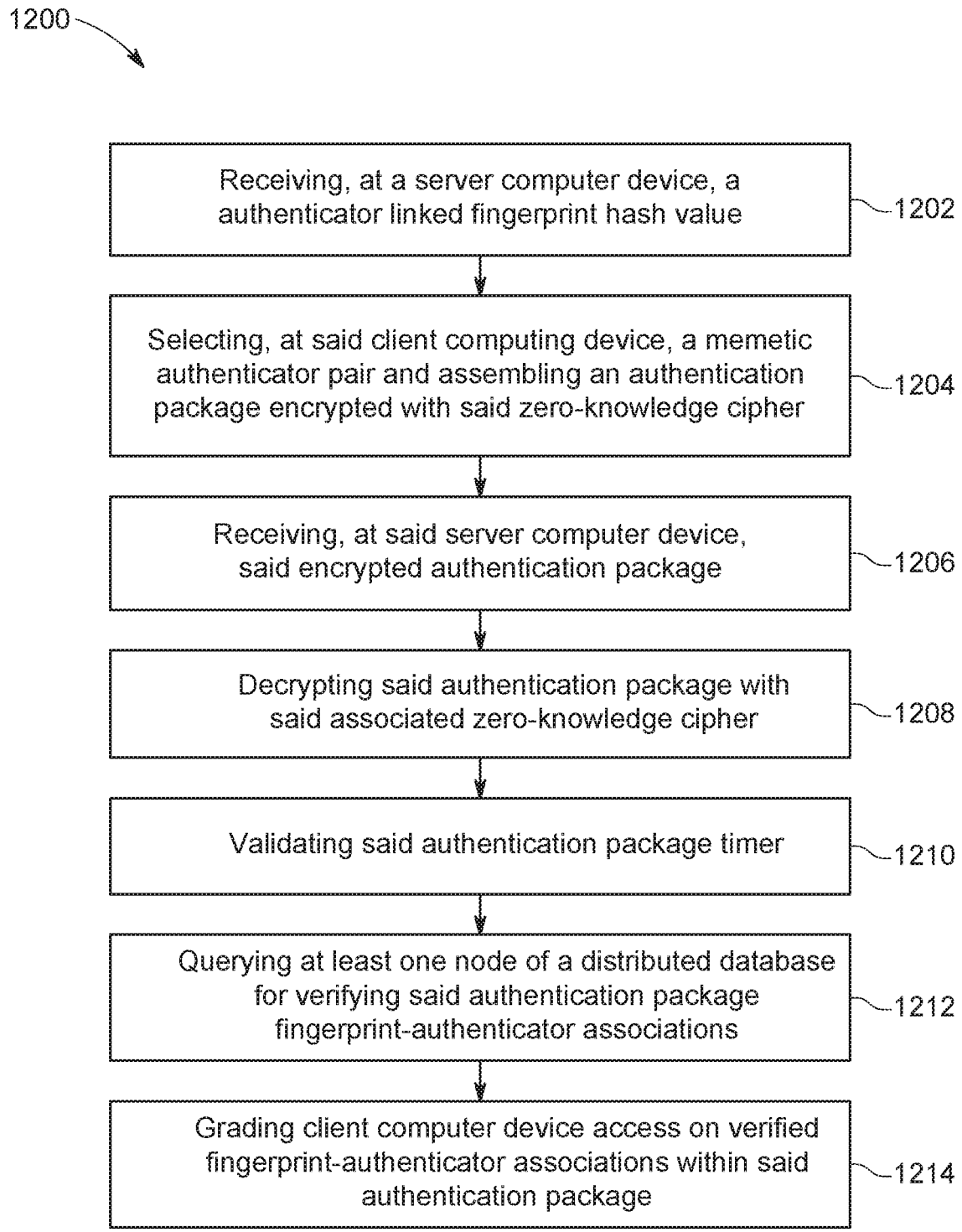
FIG. 12 is a flowchart illustrating a method for an authentication event using memetic authenticators in accordance with an aspect of the present design.

Referring now to FIG. 12, a method 1200 for authenticating a user with a service provider in accordance with an aspect of the present design includes, at 1202 receiving, at a server computer device, an authenticator-linked fingerprint hash value. For example, client device 102 (FIG. 2) may generate and send the authenticator-linked fingerprint hash value securely connecting over communications network 105 (FIG. 2) using wireless radio technology or wired cable to service provider server 101 (FIG. 2) on initiating an authentication event. The method may include retrieving information from internal storage 655 (FIG. 8) previously assigned by the user during registration, the hardware signature identifier and software signature identifier linked to the authenticator during issuing and generating a variable-length string unique key, or fingerprint, from the retrieved information. The method may include applying a hashing function to the variable-length string unique key, or fingerprint.

At 1204, in an aspect, the method may include selecting, at the client computing device, a visual or non-visual memetic authenticator pair and assembling an authenticator package encrypted with the zero-knowledge cipher. For example, the method may include generating an authentication challenge request, on receiving the fingerprint at service provider server 101 (FIG. 2), and sending the challenge request to client device 102 (FIG. 2) securely connecting over communications network 105 (FIG. 2).

The human scenario visual method may include displaying a list of randomly ordered first authenticators (e.g., avatars) and a list of randomly ordered second authenticators (e.g., totems), from authenticator store 650 (FIG. 7), on receiving the challenge request via GUI 204 (FIG. 8), forming a pair of authenticators. The method may further involve receiving a selection via gestures (or other user inputs) received at GUI 204 where on gesturing the method may capture the discrete record being displayed at that instance in time. The non-human scenario non-visual method may include mechanized selection of a discrete digital record from a list of first named set memetic authenticators and a discrete digital record from a list of second named set memetic authenticators from authenticator store 650 (FIG. 7), on receiving the challenge request, forming a pair of authenticators. The method may include aperiodically generating and sending requests for authenticator pairs, for either visual or non-visual scenarios.

In an aspect, the human scenario visual method may further include service provider server 101 randomly nominating and requesting a specific avatar frame and a specific totem frame for forming the pair of authenticators. In the non-human scenario non-visual method may further include service provider server 101 randomly nominating and requesting a specific first discrete record and a specific second discrete record, from their respective independent lists of named sets, for forming the pair of authenticators.

The method may include assembling an authenticator package including the authenticator-linked fingerprint hash value; the individual discrete records derived from the pair of selected authenticators, and a timer value.

The method may include encrypting the authenticator package with the cipher previously associated with client device 102 fingerprint during registration and stored in internal storage 655 (FIG. 7).

At 1206, in an aspect, the method may include receiving, at the server computer device, the encrypted authenticator package. For example, client device 102 (FIG. 2) may send the assembled and encrypted authenticator package securely connecting over communications network 105 (FIG. 2) using wireless radio technology or wired cable to service provider server 101 (FIG. 2).

At 1208, in an aspect, the method may include decrypting the authenticator package with the associated zero-knowledge cipher. The method may include decrypting the authenticator package using a copy of the issued cipher stored in registration profile database 720 (FIG. 8) associated with the fingerprint hash value and registration profile during the registration process. The method may further include denying the authentication event on failing to decrypt the authenticator package.

At 1210, in an aspect, the method may include validating the authenticator package timer. The method may include determining if the timer, e.g., timestamp value, decrypted from the authenticator package is within service provider server 101 (FIG. 2) expected TTL acceptable range for valid timer values. For example, the service provider operating service provider server 101 may pre-establish a permissible TTL duration (e.g., minutes, hours, or days) for the timer, e.g., timestamp value, enclosed in the authenticator package. The method may further include denying the authentication event on timer exceeding the permissible TTL duration.

At 1212, in an aspect, the method may include querying at least one node of a distributed database for verifying the authenticator package fingerprint-record associations. The method may include generating and submitting a first and second query asynchronously to the distributed database on identity network 125 (FIG. 2). For example, the first query may transmit a request for records containing the recorded fingerprint hash value and first record (e.g., avatar) hash value association and the second query may transmit a request for records containing the recorded fingerprint hash value and second record (e.g., totem) hash value association from the pair of discrete records assembled in the authenticator package. The method may include determining if the query responses received from the distributed database match the fingerprint-record associations provided in the authenticator package. To enable increased assurance and trustworthiness in the authentication event, the method may include specifying n number of nodes that should respond to the first and second queries, based on a policy configured by operator 875 (FIG. 8).

At 1214, in an aspect, the method may include granting client computer device access on verifying both query response fingerprint-record associations match the authenticator package fingerprint-record associations. For example, in the situation where service provider server 101 (FIG. 2) successfully decrypts the received authenticator package, and the embedded timer value falls within the established TTL acceptable range, and the query responses received from the distributed database match the fingerprint-record associations provided in the authenticator package, service provider server 101 may grant client device 102 (FIG. 2) access.

Figure 13:
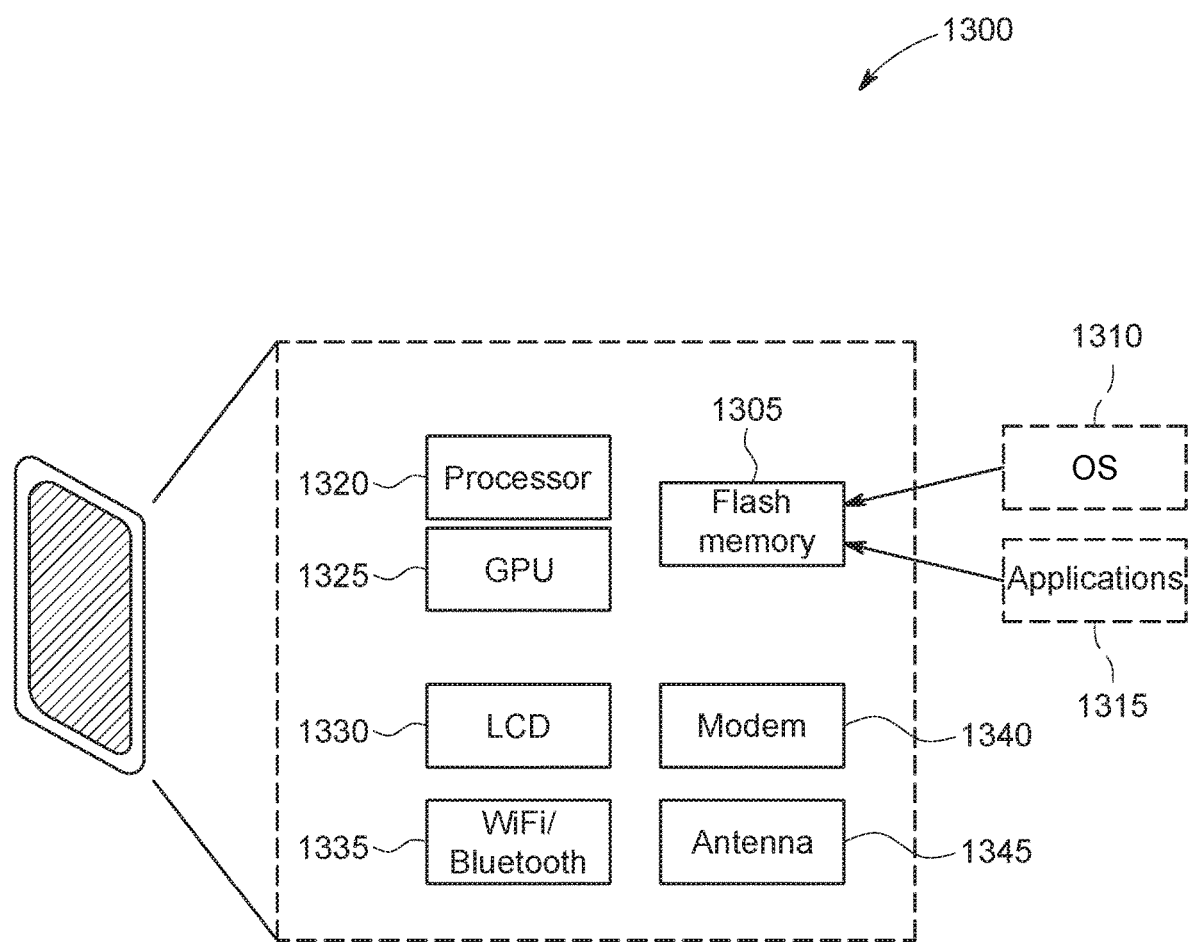
FIG. 13 illustrates a schematic block diagram for a client device for use in accordance with one embodiment of the present design.

Referring now to FIG. 13, illustrated is a schematic block diagram for an exemplary client device 1300 operable in system 100 (FIG. 1) and in communication over communications network 105 (FIG. 1). Although illustrated as a cellular radio smartphone device, the present design is not so limited and may include a gaming console, personal laptop computer, tablet, and Internet-of-Things devices, and the like. Client device 1300 may include FLASH memory 1305 for storing operating system 1310 and local version of applications 1315, such as client software 112 (FIG. 2), being executed by processor 1320. Although illustrated as FLASH memory 1305, client device 1300 may include a type of memory usable by a digital computer such as random-access memory (RAM), read-only memory (ROM), magnetic and optical discs, removable secure digital card, and so forth. Client device may include a graphics processing unit (GPU) 1325 for displaying user interface content on liquid crystal display (LCD) 1330. LCD 1330 may include a pressure and/or capacitance measuring mechanism in an arrangement for receiving interactive inputs from user 115 (FIG. 2) via GUI 204 (FIG. 2) for controlling the operation of applications 1315. Client device 1300 may include other user input devices such as a computer mouse, a game controller, keyboards, or similar input devices. Client device 1300 may configure WiFi/Bluetooth 1335 module with modem 1340 in an arrangement with antenna 1345 for realizing secure connections and communicating over communications network 105 (FIG. 2) with one or more server computer devices described herein. It should be appreciated by someone skilled in the art that client device 1300 includes all of the elements and components to execute client software 112 and interact with user 115 via GUI 204 while in communication with the other parties, such as at least one identity provider and at least one service provider, to effectuate the disclosed functionalities in operating the present design authentication and identification system.

Figure 14:
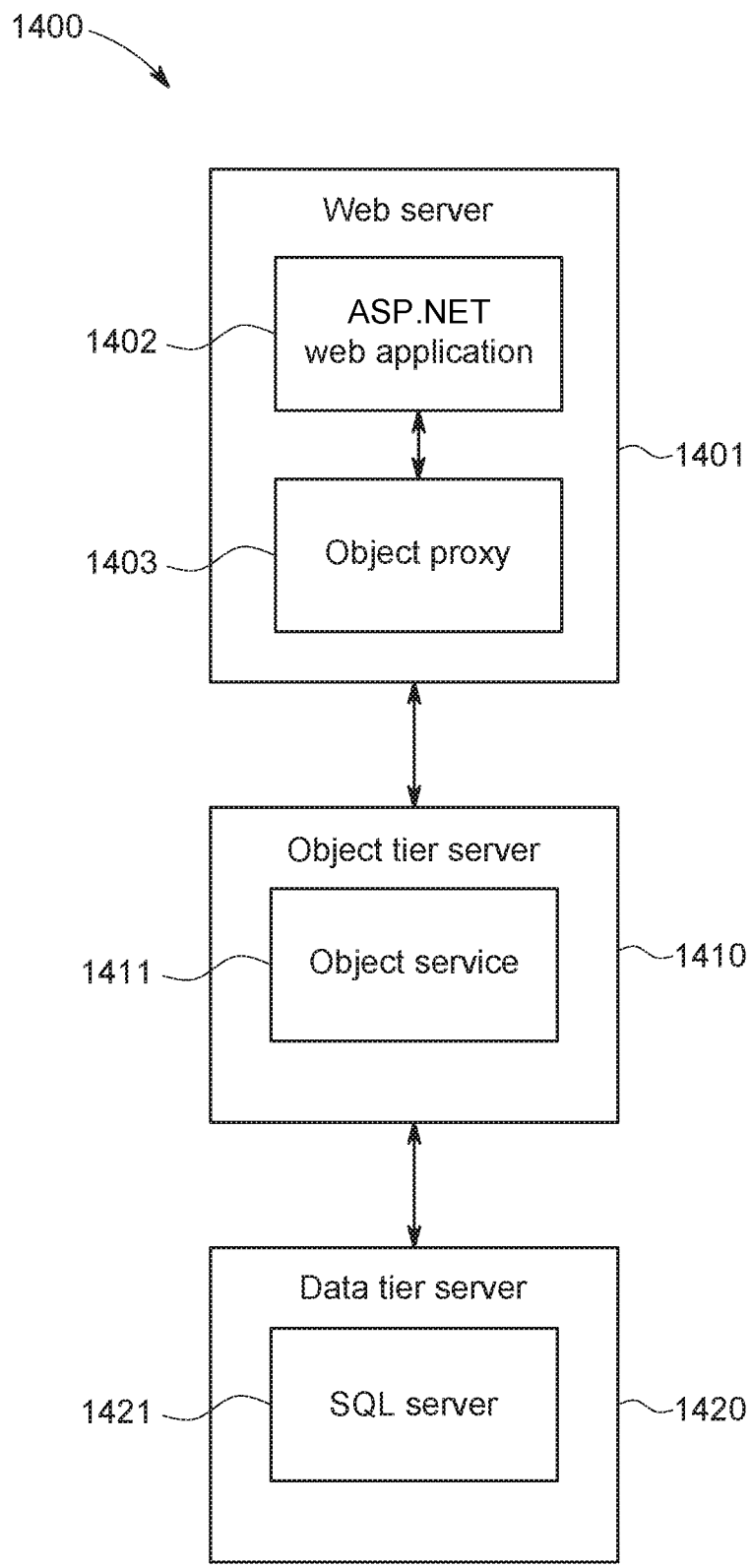
FIG. 14 illustrates an exemplary architectural representation of the identity provider and/or service provider server interaction in accordance with an aspect of the present design.

Referring now to FIG. 14, illustrated is an exemplary architectural representation of the identity provider and/or service provider server interaction side of the present design, implemented on a Microsoft platform. Although the design is not so limited and other software architectural representations that conform to the representational state transfer (REST) Web services, simple object access protocol (SOAP) Web services, and like sets of operations for client-server distributed models are possible. FIG. 14 is intended to present a multi-tier architecture for allocating and logically structuring the present disclosure functionality that comprise the authentication and identification system disclosed herein and not intended to be complete or exhaustive allocation of functionality.

The server system 1400 employs object-oriented programming and SQL database operation to effectuate the functionality described above. In general, objects are created or received and operated on while periodically, as necessary, obtaining data for purposes of generating the user interface, fingerprints, zero-knowledge ciphers, authenticator packages, and for communicating for realizing the present designs system functionality. The architecture is split into various tiers interconnected with a web server that enables access from the outside world via the Internet.

From FIG. 14, web server 1401 includes an ASP.NET web application 1402 used to interface all appropriate user functionality with the Internet, such as allowing the user to contact service provider server 101 (FIG. 2) and interact with the server for purposes of registration and authentication, and contact identity provider server 103 and interact with the server for purposes of issuing authenticators. ASP-.NET web applications are typically known to those skilled in the art. Many of the interactive functions accessed by client device 102 (FIG. 2) graphical user interface (GUI) 204 (FIG. 2) are performed by web server 1401. An object proxy 1403 is provided to provide the data to and from the web server 1401 and the other tiers in the system to effectuate the functionality described herein. The authentication and identification system components beyond web server 1401 comprise object tier server 1410, and data tier server 1420. The object tier creates and receives/translates objects for interfacing with the user via the web server 1401.

Object tier 1410 comprises object service 1411 where object service 1411 receives objects and can query the data tier or translate the object as necessary. For example, referring to FIG. 8, much of the functionality of authentication processor 805, verification processor 815, and cipher generator 715 may be performed by object service 1411, including generating and sending challenge requests, decrypting authenticator packages, creating new ciphers, and like processing to perform the requisite functionality for service provider server 101 (FIG. 2).

For example, in an aspect, authentication processor 805 may seek information, such as registration profile information and issued ciphers, from data tier 1420, structured as part of object service 1411. Data tier 1420 may include a SQL server 1421 in an arrangement having access to all the rules, schemas, dictionaries, and other data previously disclosed that is stored for use in registering user profiles, assembling authenticator packages, generating fingerprint unique keys, and so forth.

Figure 15A:
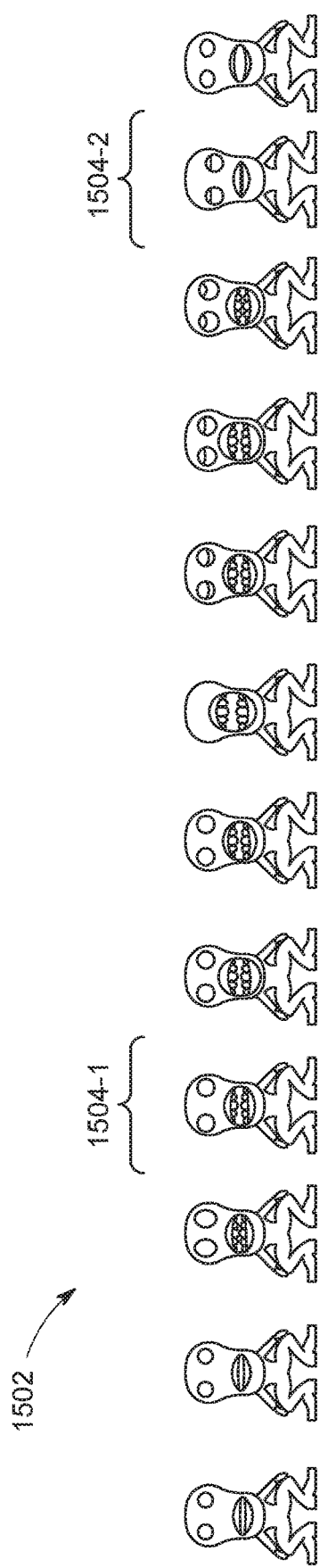
FIGS. 15A and 15B illustrate two exemplary series of frames taken from animations of an avatar and a totem, respectively, in accordance with an aspect of the present design.
Figure 15B:
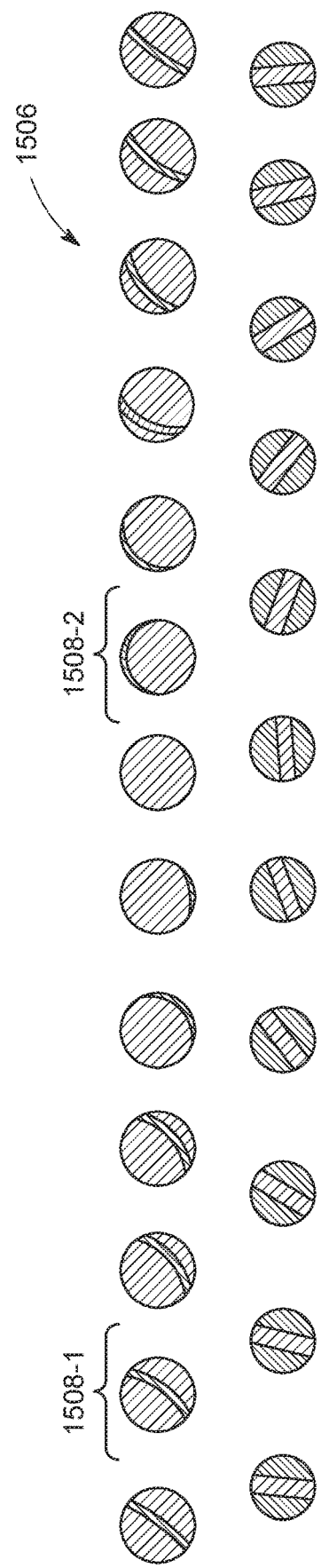

Referring now to FIGS. 15A and 15B, illustrated are exemplary series of frames taken from animations of an avatar (e.g., a monster) and a totem (e.g., a pair of differently colored bouncing balls), respectively. A series 1502 of frames from an avatar animation in the example shown in FIG. 15A has a plurality of frames, including a first 1504-1 and a second 1504-2 avatar frame. In series 1502, each of the plurality of frames from the avatar animation is different. The animation used for the avatar is digitally deconstructed into the individual frames of the plurality of frames that make up the complete avatar animation. Since each frame (e.g., digital image) is composed of a string of data including digital characters, each frame of series 1502 is passed through a cryptographic one-way hashing algorithm and output as ciphertext, to thereby facilitate associating each frame of series 1502 with the user 115 and recording the avatar frames of series 1502 on the respective user's entries in a distributed ledger as encrypted blocks (e.g., transactions).

In the example shown in FIG. 15B, a series 1506 of frames from a totem animation has a plurality frames, including a first 1508-1 and a second 1508-2 totem frame. In series 1506, each of the plurality of frames from the totem animation is different. The animation used for the totem is digitally deconstructed into the individual frames of the plurality of frames that make up the complete totem animation. Since each frame (e.g., digital image) is composed of a string of data including digital characters, each frame of series 1506 is passed through a cryptographic one-way hashing algorithm and output as ciphertext, to thereby facilitate associating each frame of series 1506 with the user 115 and recording the totem frames of series 1506 on the respective user's entries in the distributed ledger as encrypted blocks (e.g., transactions).

Figure 16A:
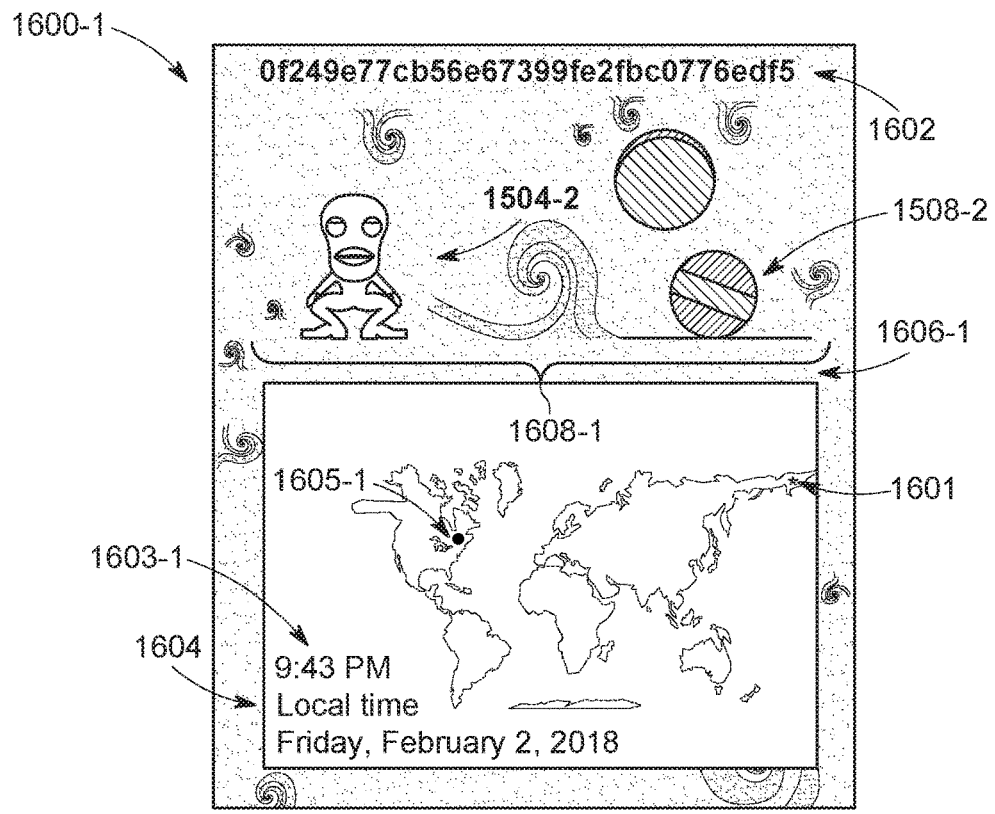
FIGS. 16A and 16B illustrated exemplary assemblages of memetic authenticators for user authentication events at two different times, in accordance with an aspect of the present design.
Figure 16B:
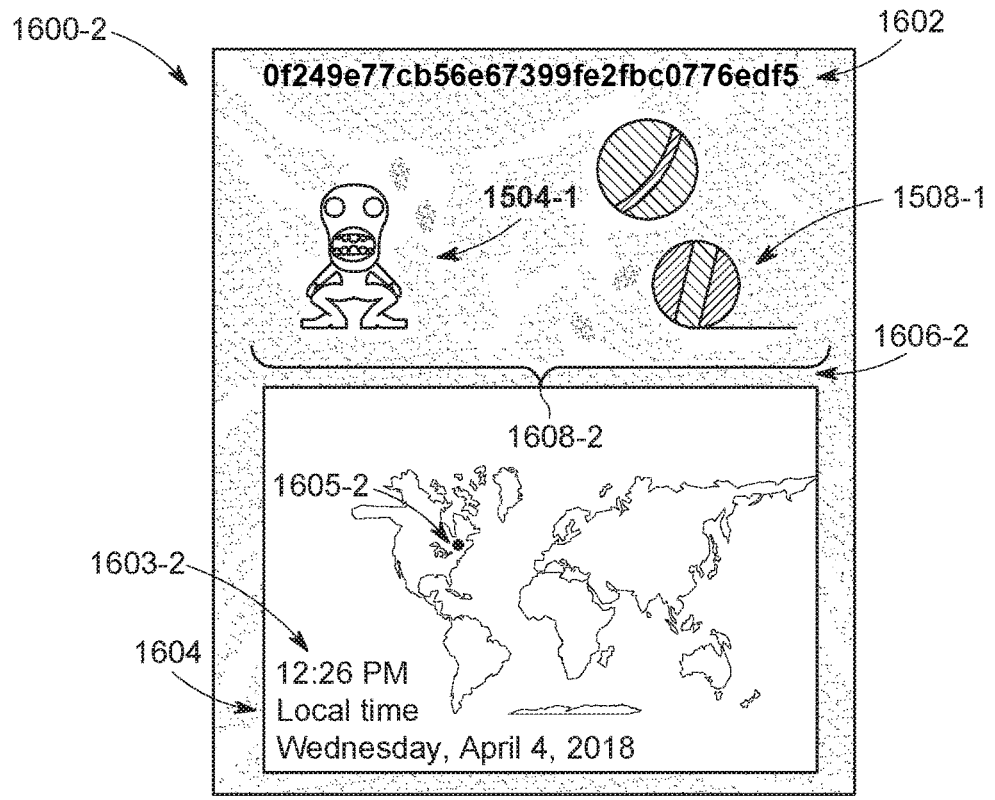

Referring now to FIGS. 16A and 16B, illustrated are exemplary assemblages of memetic authenticators for user 115 authentication events at two different times. The assemblages 1600 of data depicted in FIGS. 16A and 16B are intended to serve as an analogous schematic representation of data that, as will be readily recognized and appreciated by persons having ordinary skill in the art, are assembled, transmitted and received in the disclosed systems and methods as digital data consisting of bits valued as 1's or 0's. A first assemblage 1600-1 corresponds to a user 115 authentication at a first time 1603-1. When the user 115 wishes to authenticate at the first time 1603-1, one or more computer processors will access one or more locations of at least one memory device in communication with the processor(s) and cause a first memetic authenticator to be assembled as the first assemblage 1600-1. In the example shown in FIG. 16A, the first assemblage 1600-1 includes: one frame from series 1502 (e.g., second frame 1504-2); one frame from series 1506 (e.g., the second frame 1508-2) for the associated totem; a fingerprint 1602 (one-way hash of the hardware signature); a timer 1604 corresponding to the first time 1603-1 (e.g., 2143, derived from the above-described client node); and one or more random translucent fractal(s) of a first type 1606-1 (analogous to a cipher). In one embodiment, the processor(s) utilize global positioning system (GPS) and/or an IP address to determine the location 1605 of the user's client device 102 from which the authentication event originates, and processor(s) cause the respective location (a first location 1605-1, e.g., Duluth, Minn., USA) at the first time 1603-1 to be assembled in first assemblage 1600-1. In an example, processor(s) cause the respective location 1605-1 at the first time 1603-1 to be incorporated in the corresponding timer 1604 for the first assemblage 1600-1. Use of such client device 102 location data in the disclosed systems, methods and software provides added cybersecurity assurance for authentication events in case of subsequent authentication requests purporting to originate from the same user 115 coming from different locations (a location 1601, e.g., Vladivostok, Russia) on Earth, or elsewhere, being initiated within a period of time from first time 1603-1 (e.g., 2150 Duluth local time) that is impossible given the distance (and current transportation technological capabilities) between the respectively determined locations of first and subsequent authentication requests.

As shown in FIG. 16B, upon subsequent authentication events (e.g., at a second time 1603-2), the processor(s) will access one or more locations of memory device(s) in communication with the processor(s) and cause a second memetic authenticator to be assembled as a second assemblage 1600-2 using a combinations of frames from the avatar (e.g., from series 1502) and associated totem (e.g., from series 1506) that is different as compared to the first assemblage 1600-1. Although the combination of avatar frame and totem frame is not the same as was used at the earlier authentication time (e.g., first time 1603-1), with the second assemblage 1600-2, the fingerprint 1602 (unchanged where, e.g., the user 115 is employing the same client device 102), avatar (e.g., first frame 1504-1), and totem (e.g., first frame 1508-1) immediately identify that the user 115 is the same as before. Meanwhile, the timer 1604 corresponding to the second time 1603-2 (derived from the above-described client node) ensures that previous authenticators cannot be stolen and reused for replay attacks. Newly generated random translucent fractal(s) of a second type 1606-2 (analogous to a cipher) overlays make it nearly impossible for an attacker to steal just the avatar and totem frames to assemble bogus authenticators for subsequent attempts of replay attacks. In one embodiment, the processor(s) utilize global positioning system (GPS) and/or an IP address to determine the location 1605 of the user's client device 102 from which the authentication event originates at the second time 1603-2, and processor(s) cause the respective location (a second location 1605-2, e.g., Milwaukee, Wis., USA) at the second time 1603-2 to be assembled in second assemblage 1600-2. In an example, processor(s) cause the respective location 1605-2 at the second time 1603-2 to be incorporated in the corresponding timer 1604 for the second assemblage 1600-1.

Notably, there is nothing personally-identifying about the user 115 that is conveyed in the memetic authenticator, e.g., as shown in first 1600-1 and second 1600-2 assemblages. The memetic authenticator allows the user 115 to maintain near-complete anonymity. The service provider server 101 can verify at a glance that the user 115 is who they claim to be. If such an authenticator is stolen, an attacker cannot replay the authenticator due to the time stamp provided by the timer. Furthermore, the attacker cannot easily reverse engineer new valid authenticators due to the randomly rotating fractal overlay (e.g., changing from first type 1606-1 to second type 1606-2 cipher), and the unique, unpredictable combination of avatar +totem that is presented (e.g., a first random combination 1608-1 at the first time 1603-1 vs. a second random combination 1608-2 at the second time 1603-2). Even the fingerprint 1602 is protected since it is always conveyed as a one-way hash.

With reference to each of the above-described and illustrated embodiments, and to FIGS. 15A, 15B, 16A and 16B in particular, fingerprint 1602 may be a digital fingerprint derived as a one-way hash from something unique to the user's client device 102 including, without limitation, the media access control (MAC) address of the client device 102.

The MAC address of a client device 102 is a unique identifier assigned to a network interface controller (NIC) for communications at the data link layer of a network segment. MAC addresses are used as a network address for most IEEE 802 network technologies, including Ethernet and Wi-Fi. Most, or all, networked client devices 102 have a unique MAC address that is represented as a string of hexadecimal octets. When passed through the one-way hashing algorithm (e.g., MD5), the MAC address is output as a completely unique, undecipherable, and un-reversible string of ciphertext. For example: A0-B1-C2-D3-E4-F5>MD5>0f249e77cb56e67399fe2fbc0776edf5, as shown in FIGS. 16A and 16B. Such a fingerprint 1602 can be used to bind ownership of avatars and totems to anonymous users 115 without requiring the avatars and totems to be explicitly bound to each other, while never exposing the physical address of the client device 102. The binding occurs as part of the transaction of recording ownership of authenticators in a distributed ledger.

The timer 1604 is a system-derived function that produces a timestamp at the time (e.g., 1603) an authentication event is triggered. In an example, the timer 1604 is reconciled to Coordinated Universal Time (UTC). The timestamp produced at the moment of triggering an authentication event starts the timer 1604. Each service provider server 101 is capable of determining the elapsed time for which they would accept a valid credential from the timestamp trigger. Thus, a Time-to-Live (TTL) is configurable, or specified, within a given service provider server 101 context.

The ciphers (e.g., random translucent fractal(s) 1606-1 and/or 1606-2) practically apply the mathematical concept of infinitely complicated abstract patterns used to describe and simulate naturally occurring objects. For example, as illustrated in FIGS. 16A and 16B, all of the graphical elements described above can be assembled into the first 1600-1 and second 1600-2 assemblages and, in each case, they may be overlaid with ciphers in the form of first 1606-1 and second 1606-2 type random translucent fractals overlaying the assembled image. The translucent fractal (1606-1 and/or 1606-2) still allows the service provider server 101 to inspect the avatar and totem in the authenticator, but it prevents an attacker from being able to easily copy, forge, and re-use avatars and totems in any subsequent attempts at token replay attacks. A person having ordinary skill in the art will recognize and appreciate that additional cipher types other than random translucent fractals may be employed achieve similarly advantageous ends to enhance encryption and cybersecurity for memetic authentication in the disclosed systems, methods and software.

Figure 17:
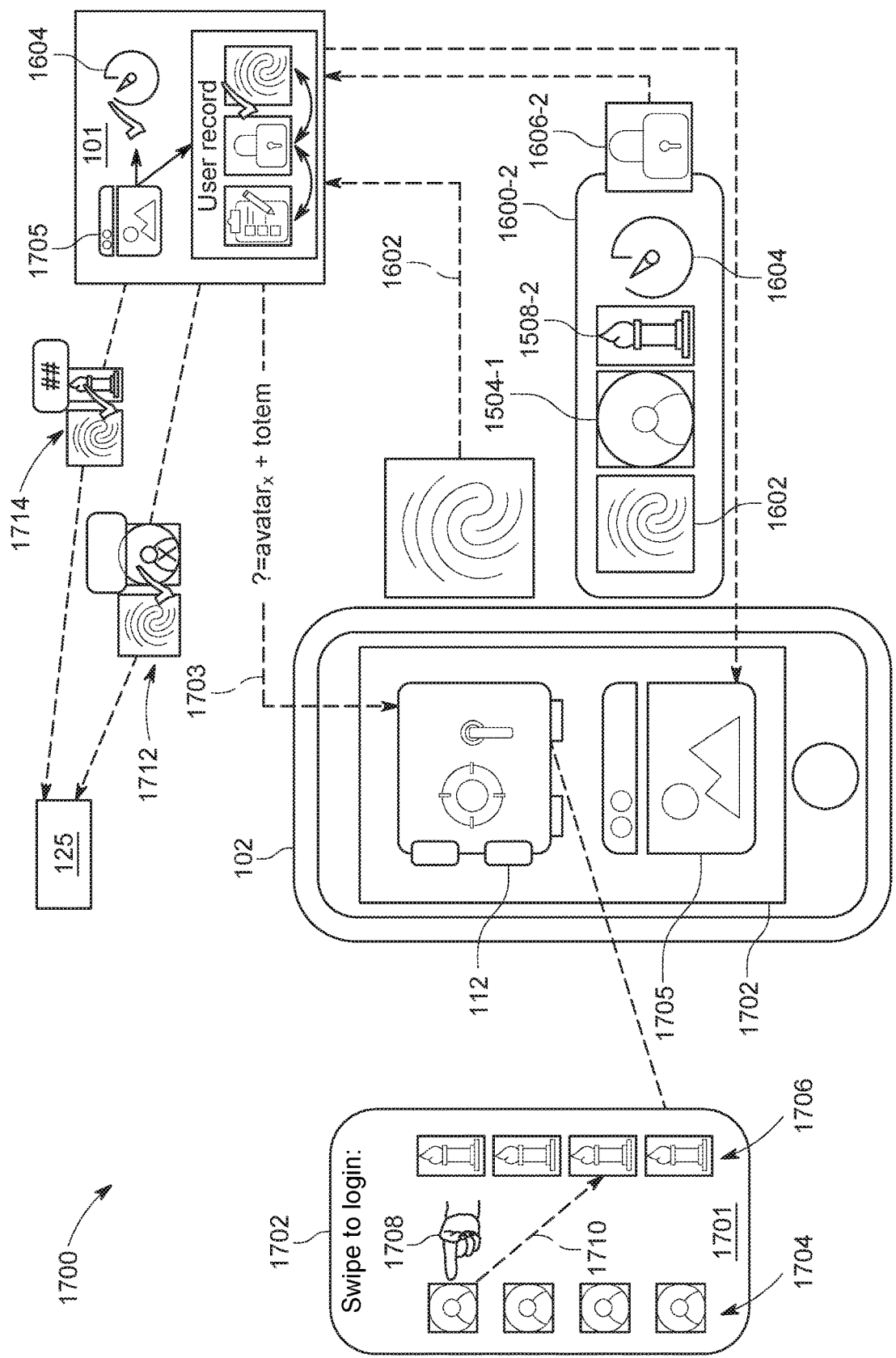
FIG. 17 illustrates an exemplary memetic authentication process, in accordance with an aspect of the present design.

Referring now to FIG. 17, illustrated is an exemplary memetic authentication process 1700. Once users 115 have acquired memetic authenticators and registered with service provider server(s) 101, they can submit their assigned memetic authenticator via client software 112 to authentication software 110 to perform authentication. FIG. 17 thus illustrates the authentication event conducted by, for instance, process 1700.

When the user 115 clicks on an app 1705 or a URL (uniform resource locator) to initiate access to a service provider server 101, the client device 102 will transmit the appropriate fingerprint 1602 to the service provider server 101 based on the assignment the user 115 previously made. Next, the service provider server 101 transmits a signal 1703 to challenge the user 115 for authentication. In response to this authentication challenge by the service provider server 101, processor(s) of client device 102 cause client software 112 to prompt the user 115 to select an avatar-totem pair in order to authenticate. For this aspect of process 1700, the client device 102 processor(s) cause a graphical user interface (GUI) 1701 to be displayed on the display 1702 of the client device 102 (e.g., smartphone). The GUI 1701 includes a first graphical listing 1704 of all, or a subset of, frames of the user's 115 animated avatars (also referred to herein as "first memetic authenticators") alongside (e.g., adjacent to, or proximal) a second graphical listing 1706 of all, or a subset of, of the user's 115 animated totems (also referred to herein as "second memetic authenticators"). In this manner, the two listings 1704 and 1706 are visible to user 115 of client device 102 at the same time on GUI 1701. In one embodiment of GUI 1701, a graphic 1708 hand with outstretched point finger may be positioned next to a top-most avatar in the graphical listing 1704. In the example shown in FIG. 17, GUI 1701 includes instructions (e.g., "Swipe to login" displayed at the top of GUI 1701) to user 115 to swipe one avatar frame in listing 1704 toward and/or atop one totem frame in listing 1706. In another embodiment, graphical listings 1704 and 1706 provide one avatar and token frame, respectively, which correspond to the user's 115 prior selections, while the other frames of the plurality of frames in listings 1704 and 1706 provide two or more additional avatar and token frames, respectively, which do not belong to user 115. In yet another embodiment, listings 1704 and 1706 include animations of user's 115 avatars and corresponding frames, respectively. In any event, as displayed on the GUI 1701, one of the plurality of first memetic authenticators and one or the plurality of second memetic authenticators correspond to the fingerprint 1602 that is associated with the client device 102.

The user 115 may authenticate by selecting the appropriate avatar-totem pair in GUI 1701 by any number of paradigms. In the embodiment shown in FIG. 17, a single-phase pair selection paradigm includes be a swipe motion (e.g., in direction 1710) where the user 115 "connects the dots" between the correct avatar and totem. In another embodiment, not shown in FIG. 17, a multi-phase pair selection paradigm includes user 115 initiating a tap gesture to select the avatar, followed by a second tap to select the totem. In one embodiment, the avatar-totem memetic authenticator pair is selected by user 115 and received by processor(s) of the client device 102 using the GUI 1701 via a combination of the single-phase, and the multi-phase, pair selection paradigms. In any event, when the user 115 the user touches the avatar frame (or animation), the frame displaying at that instant will be selected; likewise, when the user 115 connects the dots to, or taps, the corresponding totem frame (or animation), the frame displaying at that instant will be selected.

For lower assurance use cases, the service provider server 101 accepts the random selection of frames from the animated avatar and animated totem based on the instant at which the user touches them during the authentication event.

For higher assurance use cases, the service provider server 101 may optionally request one avatar frame (e.g., 1504-1) from series 1502 and one frame (e.g., 1508-1) from series 1506. The client software 112 transparently retrieves the requested frames from the avatar and totem animations selected by the user 115. This method can provide higher assurance because it significantly reduces the likelihood of an attacker successfully replaying random frames that may have been stolen or reverse engineered.

Once the user 115 has selected the correct avatar-totem pair for the application, the client software 112 assembles an authenticator package (e.g., assemblage 1600-2) including fingerprint 1602, avatar frame (e.g., 1504-1), totem frame (e.g., 1508-2), and timer 1604. The package 1600-2 is encrypted (transparent to the user 115) using the cipher (e.g., 1606-2) associated with that fingerprint 1602. Next, in process 1700, the memetic authenticator package 1600-2 is transmitted to the service provider server 101.

Notably, in process 1700, the totem is never associated directly with the avatar, nor directly with the app on any of the nodes (client node, service provider server 101, and/or identity provider server 103). The only linkage is through the fingerprint 1602, and the correct avatar-token combination must be replayed by the user 115 and verified multi-laterally between the service provider server 101 and the identity network 125. The client node never stores the hash values of the avatar and/or token animation frames locally. Converting the frames from their human-readable graphical format into their hash values occurs "just-in-time" (e.g., during the authentication event). Hashing can be performed by the client software 112 prior to encrypting the authenticator payload (e.g., 1600-2); or by the service provider server 101 upon receipt and decryption of the authenticator payload (e.g., 1600-2).

Upon receipt of an authenticator package (e.g., 1600-2), the service provider server 101 decrypts the authenticator package (e.g., 1600-2) using the locally-stored cipher (e.g., 1606-2) associated with the fingerprint 1602 asserted during the initial request. In one embodiment, if the user 115 selected an incorrect avatar-token pair in the GUI 1701, the authenticator package will be encrypted with a different cipher (1606), and the service provider server 101 will be unable to decrypt using the cipher (e.g., 1606-2) associated with that fingerprint 1602 (as established during the registration process). If decryption fails, the authentication fails, and the service provider server 101 will deny access to the user 115.

In process 1700, the service provider server 101 validates that the time 1604 is within the service provider server's 101 expected TTL. Note that TTL does not need to be a universally agreed-upon duration; each service provider server 101 could have their own policy with respect to permissible elapsed time from the timestamp within the authenticator package (e.g., 1600-2). TTL could be minutes, hours, or days depending on the service provider's assurance requirements and policies. If timer validation fails, the authentication fails, and the service provider server 101 will deny access to the user 115.

For a successful package (e.g., 1600-1) decryption and timer 1604 validation, service provider server 101 queries the distributed ledger (e.g., of identity network 125) to determine if the hashed authenticator frames belong to the asserted fingerprint 1602. The service provider server 101 issues two queries (e.g., 1712 for avatar, and 1714 for totem) to the distributed ledger of, for instance, identity network 125 asynchronously to improve speed and resistance to hacking attempts. The first query 1712 has the fingerprint 1602 and the hashed value of the avatar frame (e.g., 1504-1), and the second query 1714 has the fingerprint 1602 and the hashed value of the totem frame (e.g., 1508-1), transmitted by the client device 102. Hashing of the authenticator frames (e.g., 1504-1 and 1508-1) could be performed by the client software 112 prior to transmission of the authenticator payload (e.g., 1600-1); or by the service provider server 101 upon decryption of the authenticator payload (e.g., 1600-1). Notably, in either case, the service provider server 101 never retains, stores, or persists locally any form of the avatars or totems (e.g., as animations, frames, or hashes).

The queries 1712 and 1714 facilitate determining, by the service provider server 101, if the hashed authenticator frames in queries 1712 and 1714 belong to the fingerprint 1602 by comparing with distributed ledger entries in, for example, the identity network 125. In process 1700, verification by service provider server 101 that the hashed authenticator frames belong to the fingerprint 1602 should only take as long as the requisite hash value comparisons, which, with reasonably capable network 105 communication, tend to be fast and easy to compute.

In one embodiment, for additional assurance in process 1700, the service provider server 101 may specify how many ledger nodes in, for instance, identity network 125, are required to corroborate hash matches. For example, for low assurance scenarios, verification from a single node (e.g., 575) in identity network 125 may be sufficient. For higher assurance scenarios, verification from multiple nodes (e.g., 575) of identity network 125 may be desired to achieve a higher level of assurance that the node(s) responding have not been compromised.

In one embodiment, service provider server 101 performs episodic re-verification for additional assurance of user 115 authentication. Episodic re-verification is be natively supported by the authenticators and authentication protocol of the disclosed systems, methods and software. At any time, or at regular and/or irregular time intervals, during a user session, the service provider server 101 requests a transparent (promptless) re-verification from the client device 102 and, in response, the client device 102 transmits another unique authenticator package (e.g., as assemblage 1600) including avatar-totem frames specifically requested by the service provider server 101; or the service provider server 101 requests that the client device 102 prompt the user 115 to re-authenticate using GUI 1701, as described above (e.g., the swipe-based paradigm).

Figure 18:
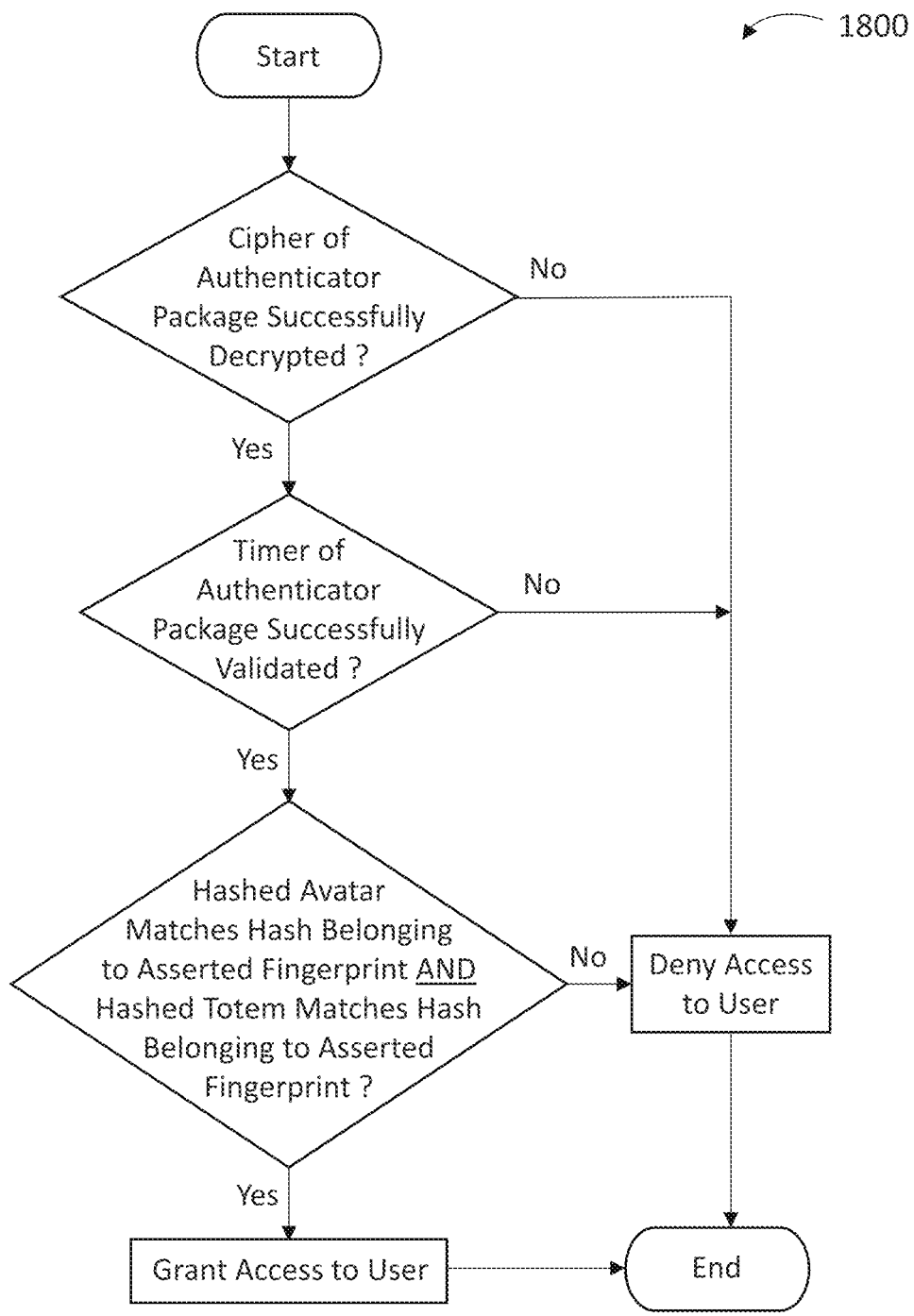
FIG. 18 illustrates a logical state diagram for adjudication of user access by the service provider server, in accordance with an aspect of the present design.

In response to an affirmative determination, by the service provider server 101, that the hashed authenticator frames in queries 1712 and 1714 belong to the fingerprint 1602, the service provider server 101 initiates an adjudication in process 1700. The service provider server 101 grants or denies user access to the app 1705 or URL according to the logical state diagram 1800 illustrated in FIG. 18. The service provider server 101 will grant or deny user access to the app 105 or the URL using the following If-Then-Else logic: (A) IF cipher 1606 sent with authenticator package 1600 successfully decrypts (AND IF timer 1604 is within the TTL (AND IF hashed avatar frame 1504 matches hash belonging to fingerprint 1602 (AND IF hashed totem frame 1508 matches hash belonging to fingerprint 1602))) THEN grant access to user 115; ELSE deny access to the user 115.

In one embodiment, for additional assurance, the service provider server 101 updates and transmits a new cipher 1606 during the grant access adjudication response to the client device 102. In an example, the service provider server 101 generates (or retrieves from the ledger of, for instance, identity network 125) a new cipher 1606, associates it with its locally persisted profile for the user 115 (e.g., "user record" as shown in FIG. 17), and transmits a command to processor(s) of the client device 102 to use the new cipher 1606 on subsequent user 115 authentication attempts. Rotating ciphers 1606 in this fashion may be implemented on a per-authentication basis (e.g., one-time use ciphers 1606), for a specified number of authentication events (e.g., expiring ciphers 1606), or on demand, all as determined by the service provider server 101 based on its assurance requirements. In all cases, cipher 1606 rotation is be transparent to the user 115.

Figure 19:
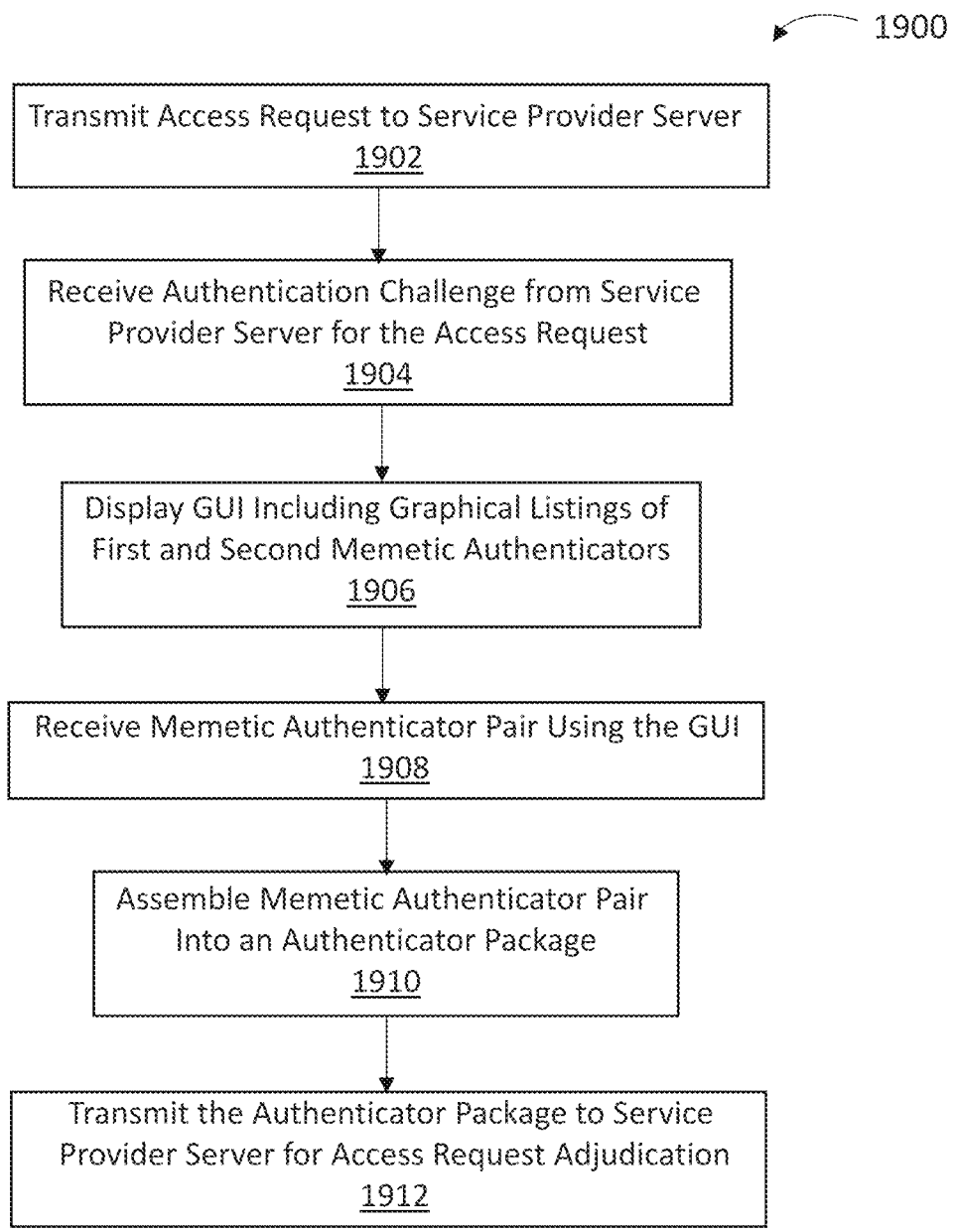
FIG. 19 is a flowchart illustrating a method for accessing an application of a uniform resource locator, in accordance with an aspect of the present design.

FIG. 19 is a flowchart illustrating a method 1900 for accessing an app or a URL. Method 1900 includes transmitting 1902, e.g., by client device 102, an access request to service provider server 101 for the application or the URL. Method 1900 includes receiving 1904, e.g., by client device 102, an authentication challenge from the service provider server 101 for the access request. Method 1900 includes displaying 1906, e.g., by client device 102, GUI 1701 including first graphical listing 1704 of a plurality of first memetic authenticators and a second graphical listing 1706 of a plurality of second memetic authenticators. In one embodiment, GUI 1701 is displayed 1906 in response to client device 102 receiving 1904 the authentication challenge from service provider server 101. For example, the first 1704 and second 1706 graphical listings are displayed concurrently on the GUI 1701. One of the plurality of first memetic authenticators and one of the plurality of second memetic authenticators correspond to a fingerprint 1602 associated with the access request. In one embodiment, the access request is transmitted 1902 to the service provider server 101 with the fingerprint 1602. For example, the fingerprint 1602 is associated with at least one of: a user 115, and the client device 102, from which the access request originated.

Method 1900 includes receiving 1908, e.g., by client device 102 and using the GUI 1701, a memetic authenticator pair including one of the first memetic authenticators and one of the second memetic authenticators. In one embodiment, the memetic authenticator pair is received using the GUI via at least one of: a single-phase selection paradigm, and a multi-phase pair selection paradigm, employed by user 115 for selecting their memetic authenticator pair on GUI 1701. Method 1900 includes assembling 1910, e.g., by client device 102, the memetic authenticator pair into an authenticator package (e.g., 1600). In one embodiment, a timer 1604 is also assembled 1910 into the authenticator package 1600. Method 1900 includes transmitting 1912, e.g., by client device 102, the authenticator package to the service provider server 101 for adjudication of the access request.

In one embodiment, method 1900 includes hashing, e.g., by client device 102 processor(s), each memetic authenticator of the memetic authenticator pair prior to transmitting 1912 the authenticator package to the service provider server 101. In an example, method 1900 includes encrypting, e.g., by client device 102 processor(s), the authenticator package prior to transmitting 1912 the authenticator package to the service provider server 101. In one embodiment, the authenticator package is encrypted using a cipher 1606 associated with the fingerprint 1602.

By the foregoing description, an improved system and method for authentication and identification have been described. The improved system and method may be substantially or completely Internet-based such that the user can connect and be in communications with the service provider server to request an authentication event. On successful authentication, the service will grant access to the applications requested by the user.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A computer-implemented method for memetic authentication, comprising:
    receiving an authenticator package assembled by a client computing device and encrypted with a zero-knowledge cipher, the authenticator package comprising:
        a non-text-based memetic authenticator pair;
        an authenticator-linked fingerprint hash value for the non-text-based memetic authenticator pair; and
        a timer;
    decrypting the authenticator package with the associated zero-knowledge cipher;
    validating the authenticator package timer; and
    querying at least one node of a distributed database, using at least the fingerprint hash value for the non-text-based memetic authenticator pair, for verifying an association of one or more records stored therein with the authenticator package; and
    granting the client computer device access to at least one of: a secured application, and a secured uniform resource locator (URL), in response to a verified association of the one or more records stored therein with the said authenticator package, or
    denying client computer access to the at least one of: the secured application, and the secured URL, in response to an unverified association of the one or more records stored therein with the said authenticator package.

2. The computer-implemented method of claim 1 further comprising:
    after granting the client computer device access to, and during a user logon session for, at least one of: the secured application, and the secured URL, transmitting an authentication re-verification request to the client computing device;
    receiving another authenticator-linked fingerprint hash value for a non-text-based memetic authenticator pair, in a second authenticator package, transmitted by the client computing device in response to receiving the authentication re-verification request; and
    in response to receiving the second authenticator package, repeating a performance of one or more of the decrypting, validating, querying, and granting or denying, steps of the method.

3. The computer-implemented method of claim 1, wherein the fingerprint comprises a combination of at least two of: a serial identifier, a hardware signature, and a software signature.

4. The computer-implemented method of claim 1, wherein the validating step comprises comparing a timer value of the decrypted authenticator package with a predetermined range of acceptable timer values.

5. The computer-implemented method of claim 1, wherein the querying step comprises transmitting requests for transaction records recorded in the distributed database.

6. The computer-implemented method of claim 5, wherein the transmitting step comprises transmitting a first request for one or more first fingerprint-record association transaction records.

7. A non-transitory computer readable medium comprising code for:
    receiving, from a client device, a request to access an application or service;
    receiving, from said client device, an authenticator fingerprint hash value;
    selecting, at said client computing device, a non-text-based memetic authenticator pair;
    assembling, at said client computing device, an authenticator package, the authenticator package comprising a fingerprint-record association for the non-text-based memetic authenticator pair and a timer;
    encrypting, at said client computing device, said authenticator package with a zero-knowledge cipher;
    receiving, at a server computer device, said encrypted authenticator package;
    decrypting, at said server computer device, said authenticator package with said associated the zero-knowledge cipher;
    validating, at said server computer device, said authenticator package timer;
    querying, at said server computer device, at least one node of a distributed database for verifying said authenticator package fingerprint-record association; and
    granting, at said server computer device, said client computer device access, on verified fingerprint-record association within said authenticator package.

8. The non-transitory computer readable medium of claim 7, further comprising code for generating a fingerprint comprising combining at least two from a serial identifier, a hardware signature, and a software signature.

9. The non-transitory computer readable medium of claim 7, further comprising code for assembling an authenticator package comprising said memetic authenticator pair and associated fingerprint hash value, and a timer.

10. The non-transitory computer readable medium of claim 7, further comprising code for validating timer comprising a predetermined range of acceptable timer values.

11. The non-transitory computer readable medium of claim 7, further comprising code for querying comprising transmitting requests for transaction records recorded in a distributed database.

12. The non-transitory computer readable medium of claim 7, further comprising code for transmitting comprising a first request for a first fingerprint-record association transaction records and a second request for a second fingerprint-record association transaction records asynchronously.

13. The computer-implemented method of claim 6, wherein the transmitting step further comprises transmitting a second request for one or more second fingerprint-record association transaction records asynchronously with the first request being transmitted.

* * * * *